United States Patent
Silberstein et al.

(10) Patent No.: US 9,249,785 B2
(45) Date of Patent: Feb. 2, 2016

(54) METHOD AND SYSTEM FOR OPERATING A SOLAR STEAM SYSTEM DURING REDUCED-INSOLATION EVENTS

(71) Applicant: BRIGHTSOURCE INDUSTRIES (ISRAEL) LTD., Jerusalem (IL)

(72) Inventors: Elon Silberstein, Arad (IL); Rotem Hayut, Jerusalem (IL)

(73) Assignee: BRIGHTSOURCE INDUSTRIES (ISREAL) LTD., Jerusalem (IL)

( * ) Notice: Subject to any disclaimer, the term of this patent is extended or adjusted under 35 U.S.C. 154(b) by 229 days.

(21) Appl. No.: 13/728,328

(22) Filed: Dec. 27, 2012

(65) Prior Publication Data

US 2013/0192589 A1    Aug. 1, 2013

Related U.S. Application Data

(60) Provisional application No. 61/593,123, filed on Jan. 31, 2012.

(51) Int. Cl.
| | |
|---|---|
| *F03G 6/06* | (2006.01) |
| *F01K 13/02* | (2006.01) |
| *F22G 5/12* | (2006.01) |

(52) U.S. Cl.
CPC . *F03G 6/06* (2013.01); *F01K 13/02* (2013.01); *F03G 6/065* (2013.01); *F22G 5/12* (2013.01); *Y02E 10/46* (2013.01)

(58) Field of Classification Search
CPC ............ Y02E 10/40–10/46; F24J 2/40–2/407; F22B 35/104; F22B 1/006; F03G 6/003; F03G 6/065
USPC ............. 60/600, 641.8–641.15; 126/569–620
See application file for complete search history.

(56) References Cited

U.S. PATENT DOCUMENTS

| | | |
|---|---|---|
| 811,274 A | 1/1906 | Carter |
| 2,999,943 A | 9/1961 | Willard |

(Continued)

FOREIGN PATENT DOCUMENTS

| | | |
|---|---|---|
| DE | 10248068 | 5/2004 |
| EP | 0106688 | 3/1985 |

(Continued)

OTHER PUBLICATIONS

"Mean and Peak Wind Load Reduction on Heliostats," Colorado State University, Solar Energy Research Institute, U.S. Department of Energy [online], Sep. 1987 [retrieved on May 16, 2012]. Retrieved from the Internet: <URL: http://www.nrel.gov/docs/legosti/old/3212.pdf>.

(Continued)

*Primary Examiner* — Thomas Denion
*Assistant Examiner* — Laert Dounis
(74) *Attorney, Agent, or Firm* — Miles & Stockbridge P.C.; Mark A. Catan

(57) ABSTRACT

A solar energy system can be controlled during periods of reduced insolation. For example, one or more environmental condition sensors can detect environmental properties indicating current or expected insolation levels and can generate at least one signal indicating a current or impending transient reduced-insolation event. The at least one signal can be received (for example, by a controller) from the sensors that indicates changes in insolation. Responsively to the at least one signal, characteristics of a current reduced insolation event or of an impending transient reduced-insolation event can be calculated. In response to the calculated characteristics, a quantity of available insolation can be calculated. An attemperation flow rate in the solar steam system can be controlled responsively to the calculated quantity of available insolation such that the temperature of steam entering the steam turbines is maintained within a predefined range.

18 Claims, 12 Drawing Sheets

(56) References Cited

U.S. PATENT DOCUMENTS

| | | |
|---|---|---|
| 3,892,433 A | 7/1975 | Blake |
| 3,924,604 A | 12/1975 | Anderson |
| 4,034,735 A | 7/1977 | Waldrip |
| 4,044,753 A | 8/1977 | Fletcher et al. |
| 4,102,326 A | 7/1978 | Sommer |
| 4,117,682 A | 10/1978 | Smith |
| 4,146,785 A | 3/1979 | Neale |
| 4,172,443 A | 10/1979 | Sommer |
| 4,219,729 A | 8/1980 | Smith |
| 4,227,513 A | 10/1980 | Blake et al. |
| 4,245,618 A | 1/1981 | Wiener |
| 4,247,182 A | 1/1981 | Smith |
| 4,265,223 A | 5/1981 | Miserlis et al. |
| 4,283,887 A | 8/1981 | Horton et al. |
| 4,289,114 A | 9/1981 | Zadiraka |
| 4,296,730 A * | 10/1981 | Zadiraka ............... 126/592 |
| 4,297,521 A | 10/1981 | Johnson |
| 4,320,663 A * | 3/1982 | Francia ............ F22B 35/104 122/451.1 |
| 4,331,829 A | 5/1982 | Palazzetti et al. |
| 4,343,182 A | 8/1982 | Pompei |
| 4,365,617 A | 12/1982 | Bugash et al. |
| 4,365,618 A | 12/1982 | Jones |
| 4,438,630 A | 3/1984 | Rowe |
| 4,459,972 A | 7/1984 | Moore |
| 4,474,169 A | 10/1984 | Steutermann |
| 4,476,853 A * | 10/1984 | Arbogast ............... 126/578 |
| 4,485,803 A * | 12/1984 | Wiener ............ F03G 6/065 126/591 |
| 4,490,981 A | 1/1985 | Meckler |
| 4,512,336 A | 4/1985 | Wiener |
| 4,564,275 A | 1/1986 | Stone |
| 4,633,854 A | 1/1987 | Mayrhofer |
| 4,665,706 A | 5/1987 | Russell et al. |
| 4,887,431 A * | 12/1989 | Peet ............... 60/667 |
| 4,913,129 A | 4/1990 | Kelly et al. |
| 4,979,493 A | 12/1990 | Seidel |
| 5,128,799 A | 7/1992 | Byker |
| 5,417,052 A | 5/1995 | Bharathan et al. |
| 5,578,140 A | 11/1996 | Yogev et al. |
| 5,759,251 A | 6/1998 | Nakamura et al. |
| 5,861,947 A | 1/1999 | Neumann |
| 5,862,799 A | 1/1999 | Yogev et al. |
| 5,867,989 A | 2/1999 | Platell |
| 5,899,199 A | 5/1999 | Mills |
| 5,905,590 A | 5/1999 | Van Der Sluis et al. |
| 5,982,481 A | 11/1999 | Stone et al. |
| 6,080,927 A | 6/2000 | Johnson |
| 6,131,565 A | 10/2000 | Mills |
| 6,310,725 B1 | 10/2001 | Duine et al. |
| 6,597,709 B1 | 7/2003 | Diver, Jr. |
| 6,653,551 B2 | 11/2003 | Chen |
| 6,662,801 B2 | 12/2003 | Hayden et al. |
| 6,818,818 B2 | 11/2004 | Bareis |
| 6,899,097 B1 | 5/2005 | Mecham |
| 6,926,440 B2 | 8/2005 | Litwin |
| 6,957,536 B2 | 10/2005 | Litwin et al. |
| 6,959,993 B2 | 11/2005 | Gross et al. |
| 7,042,615 B2 | 5/2006 | Richardson |
| 7,191,597 B2 | 3/2007 | Goldman |
| 7,191,736 B2 | 3/2007 | Goldman |
| 7,207,327 B2 | 4/2007 | Litwin et al. |
| 7,296,410 B2 | 11/2007 | Litwin |
| 7,331,178 B2 | 2/2008 | Goldman |
| 7,340,899 B1 | 3/2008 | Rubak et al. |
| 7,523,921 B2 | 4/2009 | Garrity |
| 7,884,279 B2 | 2/2011 | Dold et al. |
| 8,001,960 B2 | 8/2011 | Gilon et al. |
| 8,033,110 B2 | 10/2011 | Gilon et al. |
| 8,063,349 B2 | 11/2011 | Huss et al. |
| 8,573,196 B2 * | 11/2013 | Plotkin et al. ............... 126/609 |
| 8,627,664 B2 | 1/2014 | Katz et al. |
| 8,655,498 B2 * | 2/2014 | Bronicki ............... 700/291 |
| 2004/0086021 A1 | 5/2004 | Litwin |
| 2004/0231716 A1 | 11/2004 | Litwin |
| 2005/0126170 A1 | 6/2005 | Litwin |
| 2005/0150230 A1 * | 7/2005 | Rollins, III ............... 60/772 |
| 2007/0084208 A1 | 4/2007 | Goldman |
| 2007/0157614 A1 | 7/2007 | Goldman |
| 2007/0157922 A1 | 7/2007 | Radhakrishnan et al. |
| 2007/0221208 A1 | 9/2007 | Goldman |
| 2007/0272234 A1 | 11/2007 | Allen et al. |
| 2008/0000436 A1 | 1/2008 | Goldman |
| 2008/0011288 A1 | 1/2008 | Olsson |
| 2008/0011290 A1 | 1/2008 | Goldman et al. |
| 2008/0029150 A1 | 2/2008 | Quero et al. |
| 2008/0293132 A1 | 11/2008 | Goldman et al. |
| 2008/0295883 A1 | 12/2008 | Ducellier et al. |
| 2008/0314438 A1 | 12/2008 | Tran et al. |
| 2009/0038608 A1 | 2/2009 | Caldwell |
| 2009/0056701 A1 | 3/2009 | Mills et al. |
| 2009/0107485 A1 | 4/2009 | Reznik et al. |
| 2009/0121495 A1 | 5/2009 | Mills et al. |
| 2009/0151769 A1 | 6/2009 | Corbin et al. |
| 2009/0165780 A1 * | 7/2009 | Ota ............... 126/634 |
| 2009/0178668 A1 | 7/2009 | Boggavarapu |
| 2009/0217921 A1 | 9/2009 | Gilon et al. |
| 2009/0229264 A1 | 9/2009 | Gilon et al. |
| 2009/0249787 A1 | 10/2009 | Pfahl et al. |
| 2009/0250052 A1 | 10/2009 | Gilon et al. |
| 2009/0260619 A1 | 10/2009 | Bailey et al. |
| 2010/0006087 A1 * | 1/2010 | Gilon et al. ............... 126/572 |
| 2010/0139644 A1 | 6/2010 | Schwarzbach et al. |
| 2010/0191378 A1 | 7/2010 | Gilon et al. |
| 2010/0198420 A1 | 8/2010 | Rettger et al. |
| 2010/0236239 A1 | 9/2010 | Kroizer et al. |
| 2010/0263709 A1 | 10/2010 | Norman et al. |
| 2010/0282242 A1 | 11/2010 | Gilon et al. |
| 2010/0300510 A1 | 12/2010 | Goldman et al. |
| 2011/0008839 A1 * | 1/2011 | Chatelard et al. ............... 435/69.4 |
| 2011/0036343 A1 | 2/2011 | Kroyzer et al. |
| 2011/0067750 A1 | 3/2011 | Ueda |
| 2011/0088339 A1 | 4/2011 | McCarthy |
| 2011/0088396 A1 | 4/2011 | Katz et al. |
| 2011/0153095 A1 | 6/2011 | Rock et al. |
| 2011/0220091 A1 * | 9/2011 | Kroyzer ............... 126/572 |
| 2012/0024282 A1 | 2/2012 | Gilon et al. |
| 2012/0090323 A1 * | 4/2012 | Gonzales et al. ............... 60/641.1 |
| 2012/0227401 A1 | 9/2012 | Katz et al. |
| 2013/0133641 A1 * | 5/2013 | Shvets ............... 126/593 |
| 2013/0345996 A1 * | 12/2013 | Satoh et al. ............... 702/48 |
| 2014/0026566 A1 * | 1/2014 | Katz et al. ............... 60/641.1 |

FOREIGN PATENT DOCUMENTS

| | | |
|---|---|---|
| JP | 56-102646 | 8/1981 |
| WO | WO 2004/004016 | 1/2004 |
| WO | WO 2004/067933 | 8/2004 |
| WO | WO 2007/118223 | 10/2007 |
| WO | WO 2008/092194 | 8/2008 |
| WO | WO 2008/092195 | 8/2008 |
| WO | WO 2008/114248 | 9/2008 |
| WO | WO 2008/118980 | 10/2008 |
| WO | WO 2008/128237 | 10/2008 |
| WO | WO 2008/154599 | 12/2008 |
| WO | WO 2009/015219 | 1/2009 |
| WO | WO 2009/015388 | 1/2009 |
| WO | WO 2009/021099 | 2/2009 |
| WO | WO 2009/055624 | 4/2009 |
| WO | WO 2009/070774 | 6/2009 |
| WO | WO 2009/103077 | 8/2009 |
| WO | WO 2009/131787 | 10/2009 |
| WO | WO 2011/064718 | 6/2011 |
| WO | WO 2011080038 A2 * | 7/2011 |
| WO | WO 2011/140021 | 11/2011 |
| WO | WO 2012/014153 | 2/2012 |

OTHER PUBLICATIONS

"Central Receiver Systems" in: Stine, W.B., and Geyer, M., Power from the Sun [online], 2001 [retrieved on Nov. 17, 2009]. Retrieved from the Internet: <URL: http://www.powerfromthesun.net/Chapter10/Chapter10new.htm>, Chapter 10.

(56) References Cited

OTHER PUBLICATIONS

BCB Informatica y Control. Heliostat Calibration for Concentrating Solar Power Plants Using Machine Vision [online]. [retrieved on Nov. 17, 2009]. Retrieved from the Internet: <URL: http://bcb.es/documentos/descargar.php?id=29>.

Cohen et al., "Final Report on the Operation and Maintenance Improvement Project for Concentrating Solar Power Plants," SAND99-1290 [online], Jun. 1999 [retrieved on May 16, 2012]. Retrieved from the Internet: <URL: http://infohouse.p2ric.org/ref/17/16933/1693301.pdf>.

Lopez-Martinez et al., "Vision-based system for the safe operation of a solar power tower plant," *Iberamia*, 2002, LNAI 2527: pp. 943-952.

Meduri et al., "Performance Characterization and Operation of Esolar's Sierra Suntower Power Tower Plant," SolarPACES 2010 Conference, Sep. 21-24, 2010, Perpignan, France.

Mills et al., "Multi-Tower Solar Array Project," *Proceedings of the Solar Harvest Conference, 40th Annual ANZSES Conference*, 2002.

Peterka et al., "Wind Load Reduction for Heliostats," Solar Energy Research Institute, U.S. Department of Energy [online], May 1986 [retrieved on May 16, 2012]. Retrieved from the Internet: <URL: http://www.nrel.gov/docs/legosti/old/2859.pdf>.

Phipps, Gary S., "Heliostat Beam Characterization System Calibration Technique," U.S. Department of Commerce, National Technical Information Service, Sandia Labs, SAND791532C, 1979.

Pottler et al., "Photogrammetry: A Powerful Tool for Geometric Analysis of Solar Concentrators and Their Components," Journal of Solar Energy Engineering, Feb. 2005, 127(1): pp. 94-101.

Rabl, A., "Tower Reflector for Solar Power Plan," *Solar Energy*, 1976, 18: pp. 269-271.

Roschke, E.J., "Wind Loading on Solar Concentrators: Some General Considerations," Jet Propulsion Laboratory, National Aeronautics and Space Administration, U.S. Department of Energy [online], May 1984 [retrieved May 16, 2012]. Retrieved from the Internet: <URL: http://ntrs.nasa.gov/archive/nasa/casi.ntrs.nasa.gov/19840024844_1984024844.pdf>.

Shortis et al., "Photogrammetric Analysis of Solar Concentrators," Proceedings of the 12th Australian Remote Sensing and Photogrammetry Conference, Fremantle, Australia, 2004, pp. 1-10.

Slack et al., "Esolar Power Tower Performance Modeling and Experimental Validation," SolarPACES 2010 Conference, Sep. 21-24, 2010, Perpignan, France.

Stone, K.W., and Jones, S.A., "Analysis of Solar Two Heliostat Tracking Error Sources," Sandia National Laboratories, Report No. SAND99-0239C, Jan. 28, 1999.

Strachan, J.W. and Houser, R.M., "Testing and Evaluation of Large-Area Heliostats for Solar Thermal Applications," Solar Thermal Test Department, Sandia National Laboratories, SAND92-1381, Feb. 1993.

Vant-Hull, L.L., and Pitman, C.L., "Static and Dynamic Response of a Heliostat Field to Flux Density Limitations on a Central Receiver," *Solar Engineering*, 1990, pp. 31-38.

\* cited by examiner

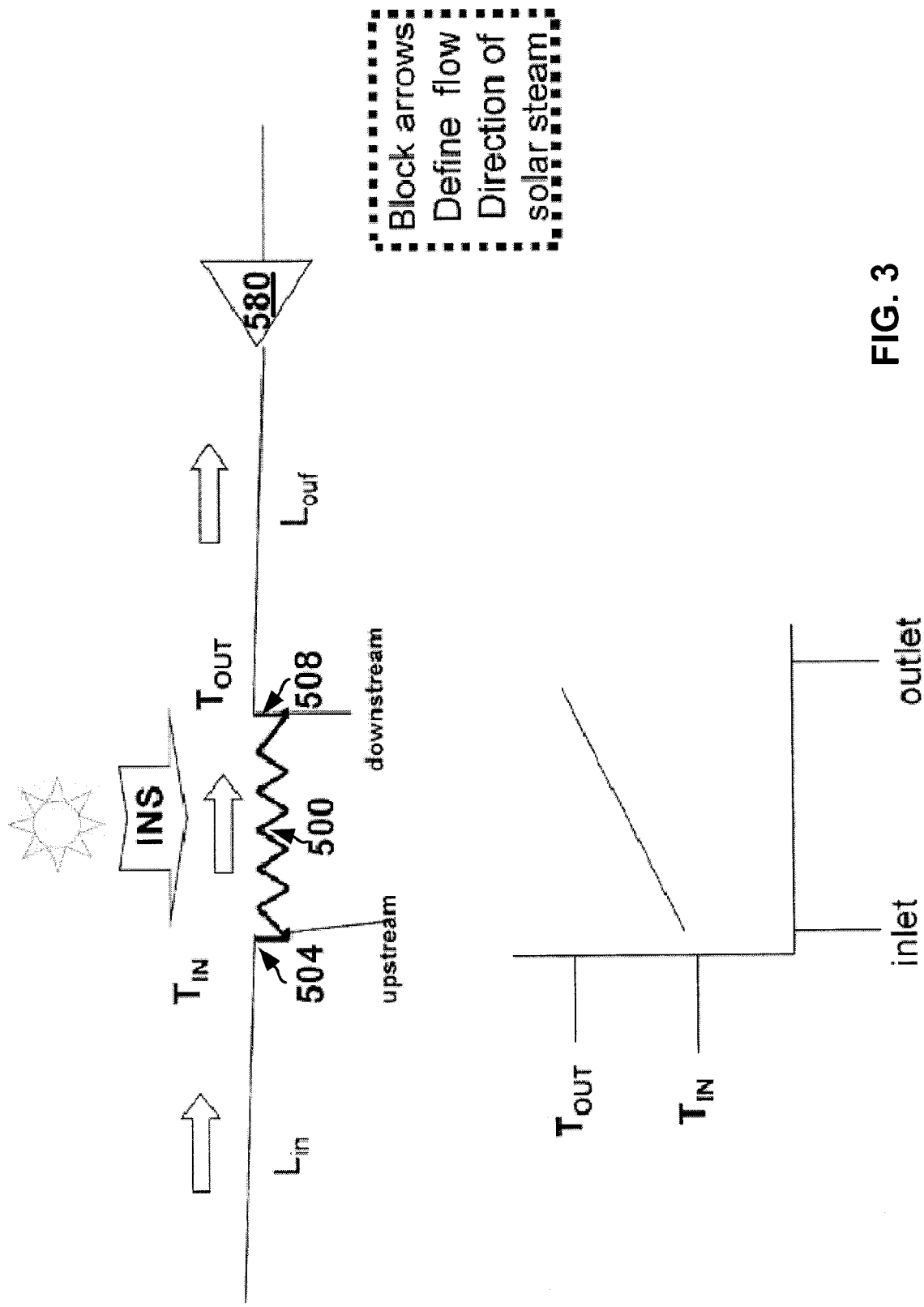

METHOD AND SYSTEM FOR OPERATING A SOLAR STEAM SYSTEM DURING REDUCED-INSOLATION EVENTS

CROSS-REFERENCE TO RELATED APPLICATIONS

The present application claims the benefit of U.S. Provisional Application No. 61/593,123, filed Jan. 31, 2012, which is hereby incorporated by reference herein in its entirety.

FIELD

The present disclosure relates generally to solar steam systems, and, more particularly, to methods and systems for operating a solar steam system in response to detected or predicted insolation conditions.

SUMMARY

Embodiments of the present disclosure relate to techniques and apparatus for operating a solar steam system responsively to detected and/or predicted changes in insolation conditions. Techniques disclosed herein may be applied to a transient or temporary reduction in insolation, or combination of factors which are detected or predicted, even if the prediction ultimately turns out to be false. Factors that may cause a temporary reduction in insolation include, but are not limited to, cloud coverage, an increased presence of dust/particulates, a temporarily dysfunctional heliostat, weather-related phenomenon (i.e., high winds) and solar eclipses.

The term transient reduction in insolation relates to events that occur during the day where there is a possibility that the level of insolation will recover during the same day. This is in contrast to reduced insolation levels that occur at the end of the day as sunset approached.

In response to a current or impending transient reduction in insolation (e.g., due to cloud cover), it is possible to provide control such that the temperature of steam entering the steam turbine is maintained prior to, during or after the reduced insolation event thereby reducing possible damage due to temperature fluctuations in the steam turbine. It is also possible to reduce the production of electricity in a steam turbine that receives superheated or reheated steam from a solar receiver by controlling the temperature of the steam entering the steam turbine.

By first calculating or determining the amount of available insolation during the reduced insolation period, the inlet temperature of the steam to the turbines may be maintained by regulating the attemperation flow rate. By opening the attemperation flow valve prior to the reduced insolation event it is possible to adjust the attemperation flow rate once the event has commenced and the amount of available insolation is low. In order to prevent thermal shock to the steam turbine once the event has ended, the attemperation flow valve may quickly be opened, thereby lowering the outlet temperature of the steam.

It is also possible in the case of heavy cloud cover to also set the temperature of the steam based on the amount of detected/predicted available insolation.

Some embodiments relate to a method of controlling a solar steam system having one or more steam turbines and one or more solar receivers. The method may include (i) detecting by one or more environmental condition sensors environmental properties indicating current or expected insolation levels. The sensors may generate at least one signal indicating a current or impending transient reduced-insolation event. The method further include (ii) receiving at least one signal from the sensors that indicate changes in insolation; (iii) responsively to the at least one signal, calculating characteristics of a current reduced insolation event or of an impending transient reduced-insolation event; (iv) in response to the result of the calculated characteristics, calculating a quantity of available insolation; and (v) controlling an attemperation flow rate in the solar steam system responsively to a result of the calculating a quantity of available insolation such that the temperature of steam entering the one or more steam turbines is maintained in a predefined range.

The environmental condition sensors may include at least one of a pyroheliometer, a camera aimed at the sky, a camera positioned and aimed to capture cloud shadows, a device to measure dust and/or particulate levels, a flux measurement device and a weather station. The one or more solar receivers may be selected from the group consisting of a solar steam superheater and a solar steam reheater. The current or impending transient reduced-insolation event may be one of a cloud-induced reduced insolation event, a weather-induced reduced insolation event and a dust/particulate-induced reduced insolation event.

The step of controlling the attemperation flowrate may further comprise re-aiming a plurality of heliostats to increase the total amount of insolation directed at the receiver and opening an attemperation valve.

In some embodiments, the method may further comprise (vi) setting the inlet temperature of the steam entering the one or more turbines based at least in part on the calculation or determination of the amount of available insolation. The method may further comprise (vii) regulating an inlet temperature of the steam entering the one or more turbines to be the maximum temperature of the steam allowed in the steam turbine, in response to an additional insolation level detection or prediction that occurs at a later time after the regulating of the attemperation flow rate. The inlet temperature of the steam in step (vi) may be less than or equal to the inlet temperature of the steam in step (vii). The inlet temperature of the steam in step (vi) is 50° C., 75° C., 100° C. or 150° C. less than the inlet temperature of the steam in step (vii). In a further embodiment, the method may further comprise reducing the flow rate of steam so that the flow rate of steam to the turbine is reduced.

Some embodiments relate to a solar steam system for generating electricity from solar radiation. The system may include one or more solar receivers, each being configured to heat steam therein using insolation such that outlet steam temperature at the outlet of each solar receiver exceeds a temperature at an inlet thereto; one or more steam turbines configured to receive the insolation-heated steam from the one or more solar receivers; and an attemperation flow controller configured to regulate the attemperation flow, the attemperation flow controller being configured to maintain the temperature of steam entering the one or more steam turbines in response to a control signal; wherein the control signal is generated from one or more environmental condition sensors that indicate changes in insolation.

The one or more receiver may be selected from the group consisting of a solar steam superheater and a solar steam reheater.

The system may further include a distributed control system configured to maintain the temperature of steam entering the one or more steam turbines before and/or after a transient reduced-insolation event. In some embodiments, the system may also include electronic circuitry configured to analyze data descriptive of prevailing or historical weather conditions and to effect the detection or prediction according to results of the analysis. The electronic circuitry includes one or more of analog electronics, digital electronics and computer-executable code.

Some embodiments relate to a method of controlling a solar steam system, having one or more steam turbines and one or more solar receivers. The method may include (i) detecting by one or more environmental condition sensors environmental properties indicating current or expected insolation levels. The sensors may generate at least one signal indicating a current or impending transient reduced-insolation event. The method further include (ii) receiving at least one signal from the sensors that indicate changes in insolation; (iii) responsively to the at least one signal, calculating characteristics of a current reduced insolation event or of an impending transient reduced-insolation event; (iv) in response to the result of the calculated characteristics, calculating a quantity of available insolation; and (v) setting an inlet temperature of the steam entering the one or more turbines based a responsively to a result of the calculating a quantity of available insolation; wherein the set inlet temperature of the steam is lower than the inlet temperature of the steam before receiving the signal indicating a change in insolation.

The method may further include (vi) regulating an inlet temperature of the steam entering the one or more turbines so that the inlet temperature of the steam is the maximum temperature of the steam allowed in the steam turbine, in response to an additional change in insolation level that occurs at a later time after the setting the inlet temperature. The inlet temperature of the steam in step (v) is less than or equal to the inlet temperature of the steam in step (vi). The inlet temperature of the steam in step (v) is 50° C., 75° C., 100° C. or 150° C. less than the inlet temperature of the steam in step (vi).

Some embodiments relate to a method of controlling a solar steam system, having one or more steam turbine and at least one solar receiver. The solar receiver being selected from the group consisting of a solar steam superheater and a solar steam reheater. The solar receiver being configured to heat a fluid therein using reflected solar radiation, and the steam turbine being configured to generate electricity using fluid heated by the solar receiver. The method may include during a first insolation condition, regulating the outlet temperature of the steam fluid flowing through the solar receiver so as to produce electricity. During a second insolation condition, which may be at a lower insolation level than the first insolation condition, regulating fluid flow through the solar receiver and to the steam turbine such that the inlet temperature of fluid to the steam turbine is reduced as compared to the first insolation condition. During the first insolation condition the inlet temperature of the steam entering the one or more turbines may be determined via a signal generated by the distributed control system. During the second insolation condition the inlet temperature of the steam entering the one or more turbines may be determined via a signal one or more environmental condition sensors that indicate changes in insolation.

The second insolation condition may include one of cloud-induced reduced insolation event, a weather-induced reduced insolation event and a dust-induced reduction insolation event.

According to some embodiments, during the second insolation condition, electricity generated by the steam turbine is reduced as compared to the electricity generated produced during the first insolation condition.

Objects and advantages of embodiments of the present disclosure will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIG. 3 illustrates a solar steam system where superheated steam flows from a solar receiver to a turbine, according to one or more embodiments.

DETAILED DESCRIPTION

A central receiver system, such as one with a receiver supported on a tower, can include at least one solar receiver and a plurality of heliostats. Each heliostat tracks to reflect light to a target on a tower or an aiming point on such a target. The heliostats can be arrayed in any suitable manner. For example, heliostat spacing and positioning can be selected to provide optimal financial return over a life cycle according to predictive weather data and at least one optimization goal, such as total solar energy utilization, energy storage, electricity production, or revenue generation from sales of electricity.

Figure 1A:
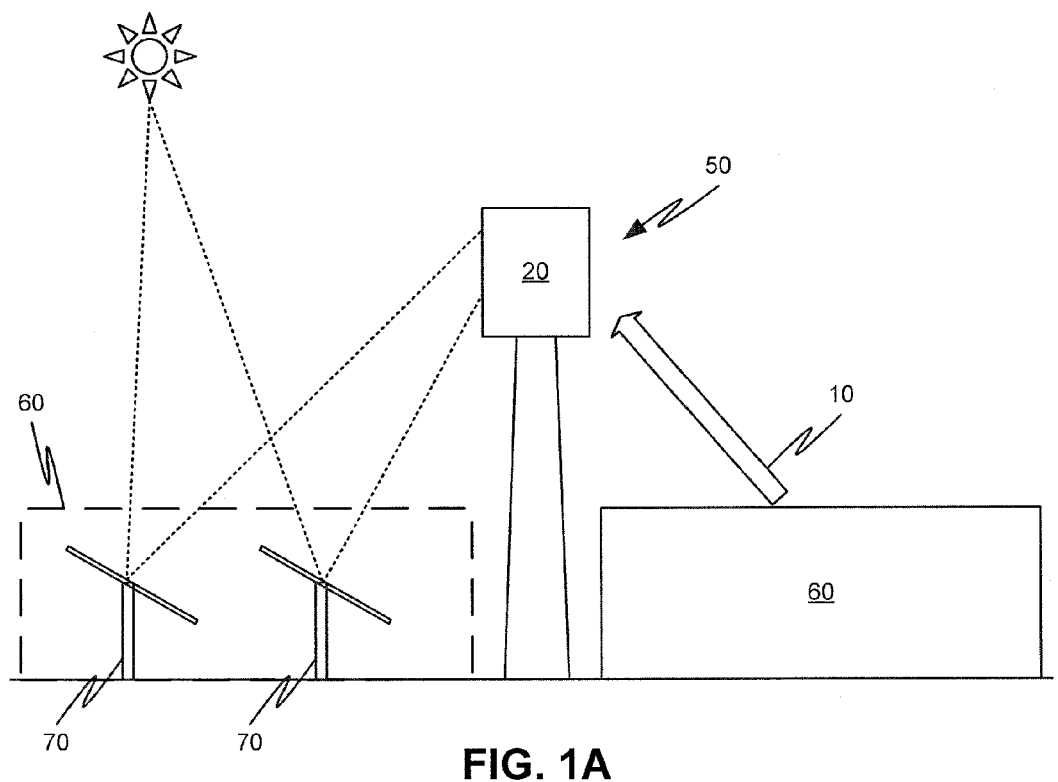
FIG. 1A shows a solar power tower system, according to one or more embodiments of the disclosed subject matter.

Insolation can be used by a solar tower system to generate superheated steam and/or supercritical steam and/or to heat molten salt. In FIG. 1A, a solar tower system can include a solar tower 50 that receives reflected focused sunlight 10 from a solar field 60 of heliostats (individual heliostats 70 are illustrated in the left-hand portion of FIG. 1A only). For example, the solar tower 50 can have a height of at least 25 meters, 50 meters, 75 meters, 100 meters, 125 meters, or higher. The heliostats 70 can be aimed at solar energy receiver system 20, for example, a solar energy receiving surface of one or more receivers of system 20. Heliostats 70 can adjust their orientation to track the sun as it moves across the sky, thereby continuing to reflect sunlight onto one or more aiming points associated with the receiver system 20. A solar energy receiver system 20, which can include one or more individual receivers, can be mounted in or on solar tower 50. The solar receivers can be constructed to heat water and/or steam and/or supercritical steam and/or any other type of solar fluid using insolation received from the heliostats. Alternatively or additionally, the target or receiver 20 can include, but is not limited to, a photovoltaic assembly, a steam-generating assembly (or another assembly for heating a solid or fluid), a biological growth assembly for growing biological matter (e.g., for producing a biofuel), or any other target configured to convert focused insolation into useful energy and/or work.

The term "receiver," by itself, is used herein to refer to the portion of the device targeted by the receiver which captures and converts incident flux to heat and which are actively cooled by a heat transfer or working fluid as opposed to portions that are primarily reflective or simply used to re-radiate or convect heat such as thermal tiles or refractory shades. The receiver may be the aggregate of concentrated light-receiving portions of a boiler, heat exchanger, superheater, or other device used for converting sunlight to heat in a fluid.

Figure 1B:
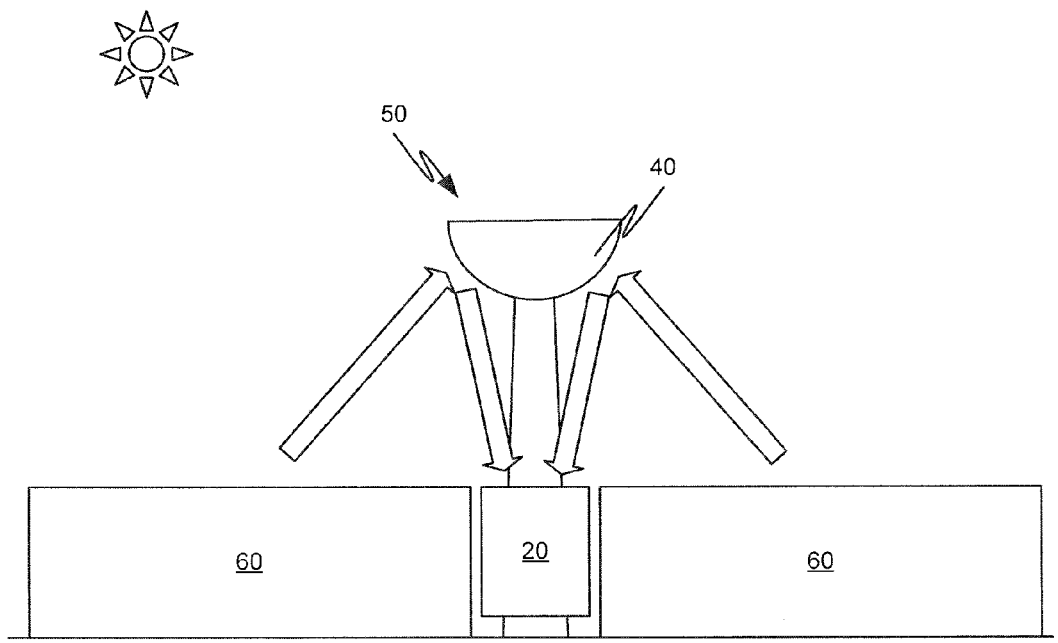
FIG. 1B shows a solar power tower system with secondary reflector, according to one or more embodiments of the disclosed subject matter.

The solar energy receiver system 20 can be arranged at or near the top of tower 50, as shown in FIG. 1A. In another embodiment, a secondary reflector 40 can be arranged at or near the top of a tower 50, as shown in FIG. 1B. The secondary reflector 40 can thus receive the insolation from the field of heliostats 60 and redirect the insolation (e.g., through reflection) toward a solar energy receiver system 20. The solar energy receiver system 20 can be arranged within the field of heliostats 60, outside of the field of heliostats 60, at or near ground level, at or near the top of another tower 50, above or below reflector 40, or elsewhere.

Figure 1C:
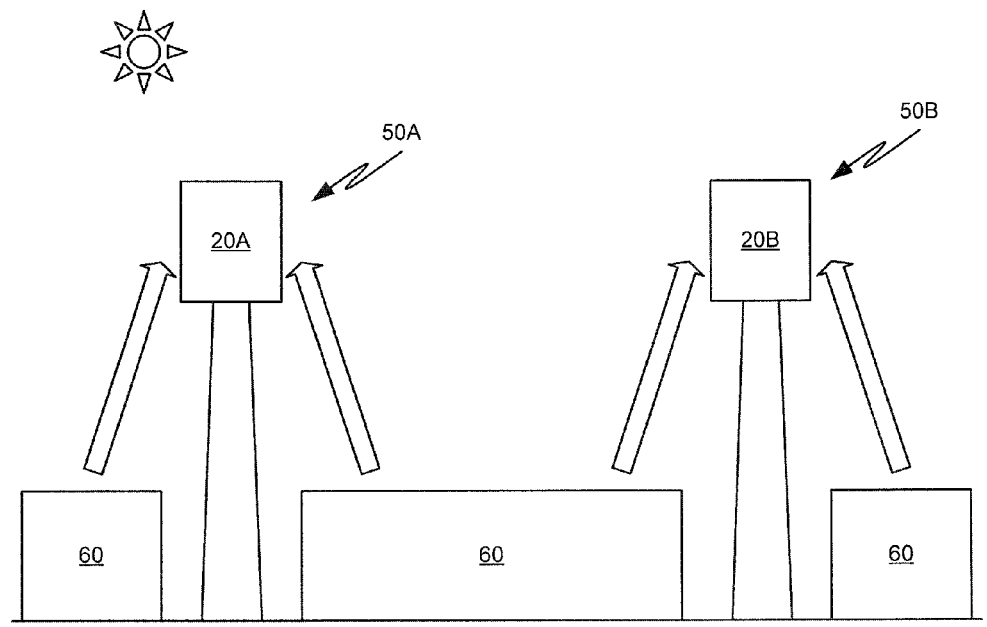
FIG. 1C shows a solar power tower system including multiple towers, according to one or more embodiments of the disclosed subject matter.

More than one solar tower 50 can be provided, each with a respective solar energy receiving system thereon, for example, a solar power steam system. The different solar energy receiving systems can have different functionalities. For example, one of the solar energy receiving systems can heat water using the reflected solar radiation to generate steam while another of the solar energy receiving systems can serve to superheat steam using the reflected solar radiation. The multiple solar towers 50 can share a common heliostat field 60 or have respective separate heliostat fields. Some of the heliostats can be constructed and arranged so as to alternatively direct insolation at solar energy receiving systems in different towers. In addition, the heliostats can be configured to direct insolation away from any of the towers, for example, during a dumping condition. As shown in FIG. 1C, two solar towers can be provided, each with a respective solar energy receiving system. A first tower 50A has a first solar energy receiving system 20A while a second tower 50B has a second solar energy receiving system 20B. The solar towers 50A, 50B are arranged so as to receive reflected solar radiation from a common field of heliostats 60. At any given time, a heliostat within the field of heliostats 60 can be directed to a solar receiver of any one of the solar towers 50A, 50B. Although only two solar towers with respective solar energy receiving systems are shown in FIG. 1C, any number of solar towers and solar energy receiving systems can be employed.

Figure 1D:
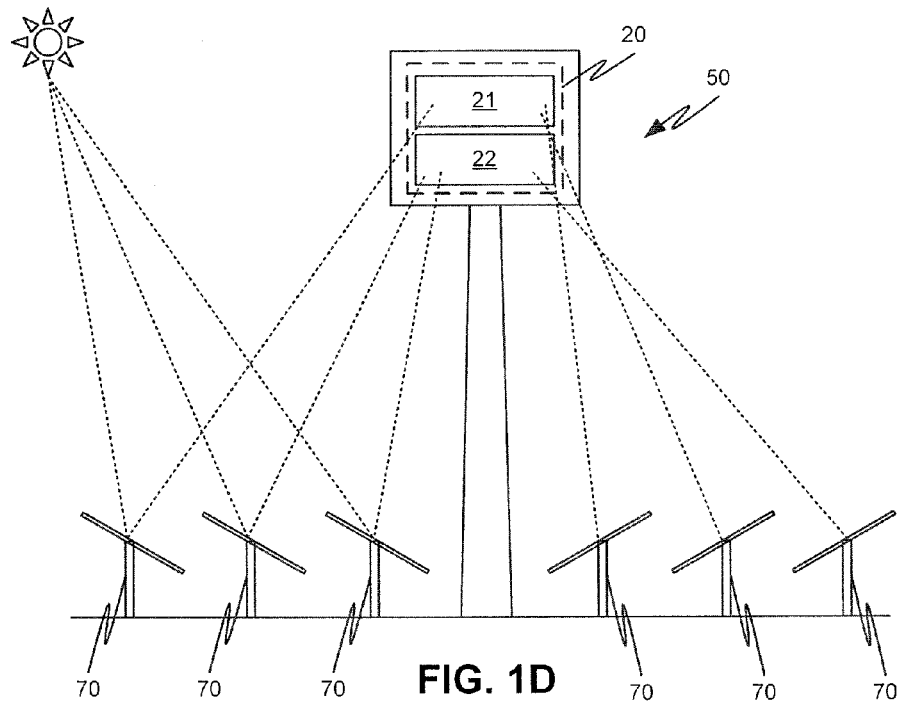
FIG. 1D shows a solar power tower system including multiple receivers in a single tower, according to one or more embodiments of the disclosed subject matter.

More than one solar receiver can be provided on a solar tower. The multiple solar receivers in combination can form a part of the solar energy receiving system 20. The different solar receivers can have different functionalities. For example, one of the solar receivers can heat water using the reflected solar radiation to generate steam while another of the solar receivers can serve to superheat steam using the reflected solar radiation. The multiple solar receivers can be arranged at different heights on the same tower or at different locations (e.g., different faces, such as a north face, a west face, etc.) on the same tower. Some of the heliostats in field 60 can be constructed and arranged so as to alternatively direct insolation at the different solar receivers. As shown in FIG. 1D, two solar receivers can be provided on a single tower 50. The solar energy receiving system 20 thus includes a first solar receiver 21 and a second solar receiver 22. At any given time, a heliostat 70 can be aimed at one or both of the solar receivers, or at none of the receivers. In some use scenarios, the aim of a heliostat 70 can be adjusted so as to move a reflected beam projected at the tower 50 from one of the solar receivers (e.g., 21) to the other of the solar receivers (e.g., 22). Although only two solar receivers and a single tower are shown in FIG. 1D, any number of solar towers and solar receivers can be employed.

Figure 2:
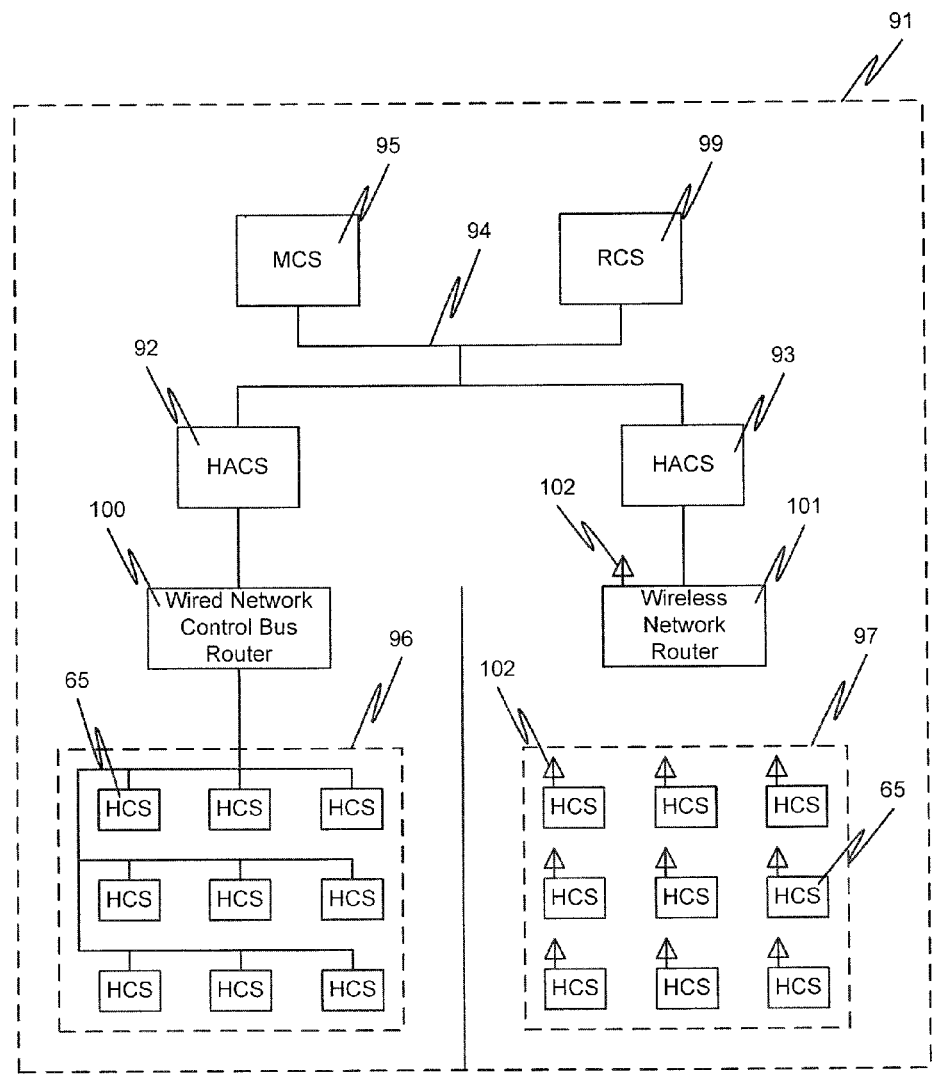
FIG. 2 is a schematic diagram of a heliostat control system, according to one or more embodiments of the disclosed subject matter.

Heliostats 70 in a field 60 can be controlled through a central heliostat field control system 91, for example, as shown in FIG. 2. For example, a central heliostat field control system 91 can communicate hierarchically through a data communications network with controllers of individual heliostats. FIG. 2 illustrates a hierarchical control system 91 that includes three levels of control hierarchy, although in other implementations there can be more or fewer levels of hierarchy, and in still other implementations the entire data communications network can be without hierarchy, for example, in a distributed processing arrangement using a peer-to-peer communications protocol.

At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats 70 (not shown) in heliostat fields 96, 97, by communicating with programmable heliostat control systems 65 associated with those heliostats 70 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 2, the portion of network 94 provided in heliostat field 96 can be based on copper wire or fiber optic connections, and each of the programmable heliostat control systems 65 provided in heliostat field 96 can be equipped with a wired communications adapter, as are master control system 95, heliostat array control system 92 and wired network control bus router 100, which is optionally deployed in network 94 to handle communications traffic to and among the programmable heliostat control systems 65 in heliostat field 96 more efficiently. In addition, the programmable heliostat control systems 65 provided in heliostat field 97 communicate with heliostat array control system 93 through network 94 by means of wireless communications. To this end, each of the programmable heliostat control systems 65 in heliostat field 97 is equipped with a wireless communications adapter 102, as is wireless network router 101, which is optionally deployed in network 94 to handle network traffic to and among the programmable heliostat control systems 65 in heliostat field 97 more efficiently. In addition, master control system 95 is optionally equipped with a wireless communications adapter (not shown).

FIG. 3 is a block diagram of a solar steam system for producing electricity by a turbine. The system includes a solar receiver (i.e. boiler and/or superheater and/or reheater and/or supercritical steam generator) where concentrated solar radiation (or insolation) heats a working fluid. In the configuration of FIG. 3, water and/or steam (at a temperature of $T_{in}$) enters the solar receiver 500 via inlet 504 and line $L_{in}$, and steam (at a temperature of $T_{out}$) leaves the solar receiver 500 via outlet 508 and line $L_{out}$.

Because the solar receiver receives concentrated insolation (indicated by INS in the figure), the enthalpy in the steam leaving the solar receiver 500 (having a temperature indicated in FIG. 3 as $T_{out}$), exceeds that at which steam and/or water, including the temperature represented as $T_{in}$, enters the solar receiver 500. For example, representative temperature difference ($T_{out}-T_{in}$) may be 30 or 50 or 70 or 100 or 150 or 200 or 300 or 400 degrees Celsius.

The heated steam flows to turbine 580 (e.g., single stage or multiple stage) where electricity is generated. As is seen from FIG. 3, the steam flows in a defined direction within steam line $L_{in}$ (illustrated by the block arrows), the solar boiler system itself, and within steam line $L_{out}$ towards the turbine 580 (illustrated by the block arrows).

As is indicated by the graph at the bottom of FIG. 3, wherein the horizontal axis represents linear distance along a fluid path within the solar boiler, and the vertical axis represents steam temperature, there is typically some temperature profile along the length of the solar boiler. It is appreciated that the linear profile illustrated is just one non-limiting example, and different embodiments will be characterized by respective (different) temperature profiles.

Figure 4A:
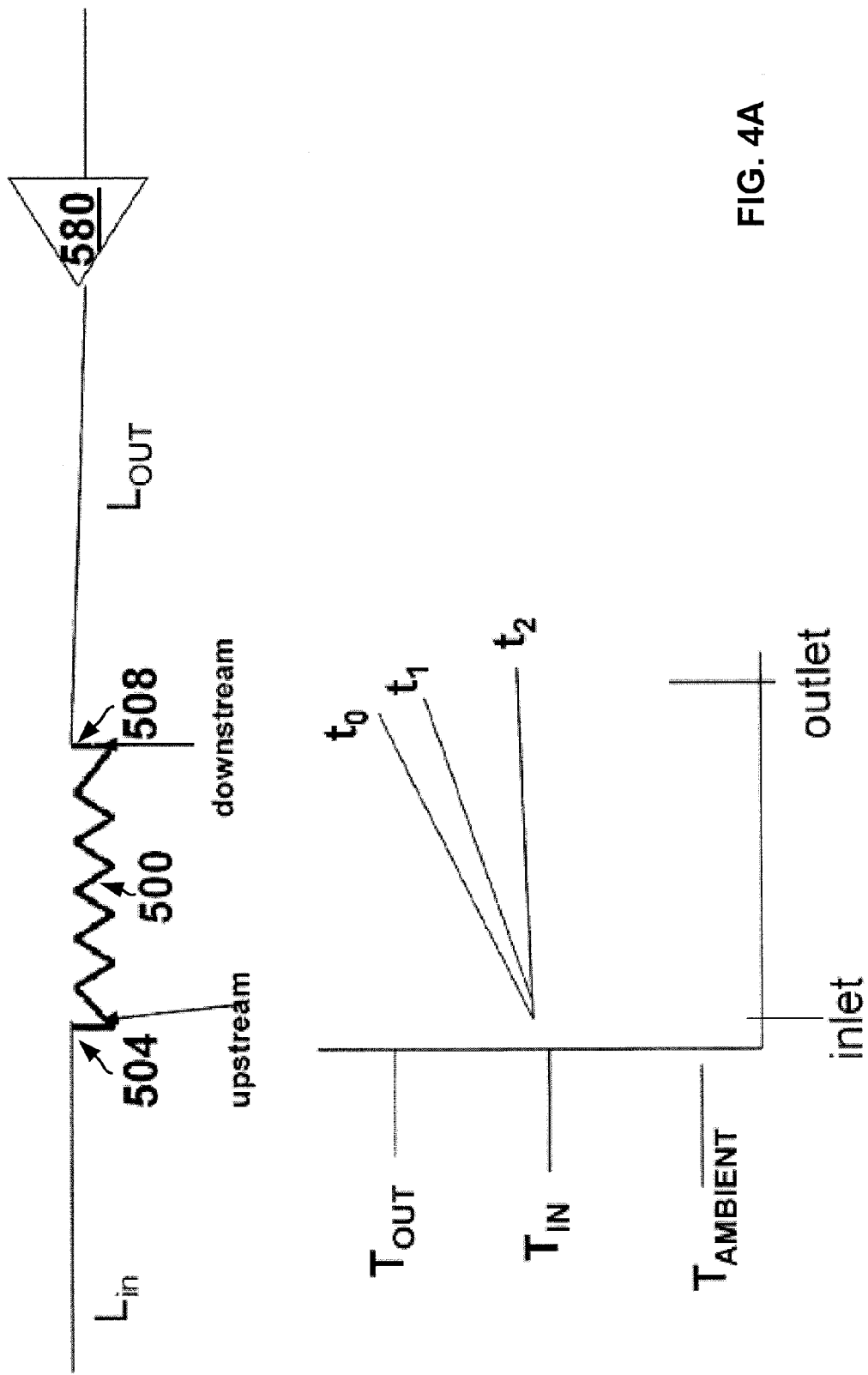
FIGS. 4A-4B illustrate the cooling of a solar receiver, according to one or more embodiments.
Figure 4B:
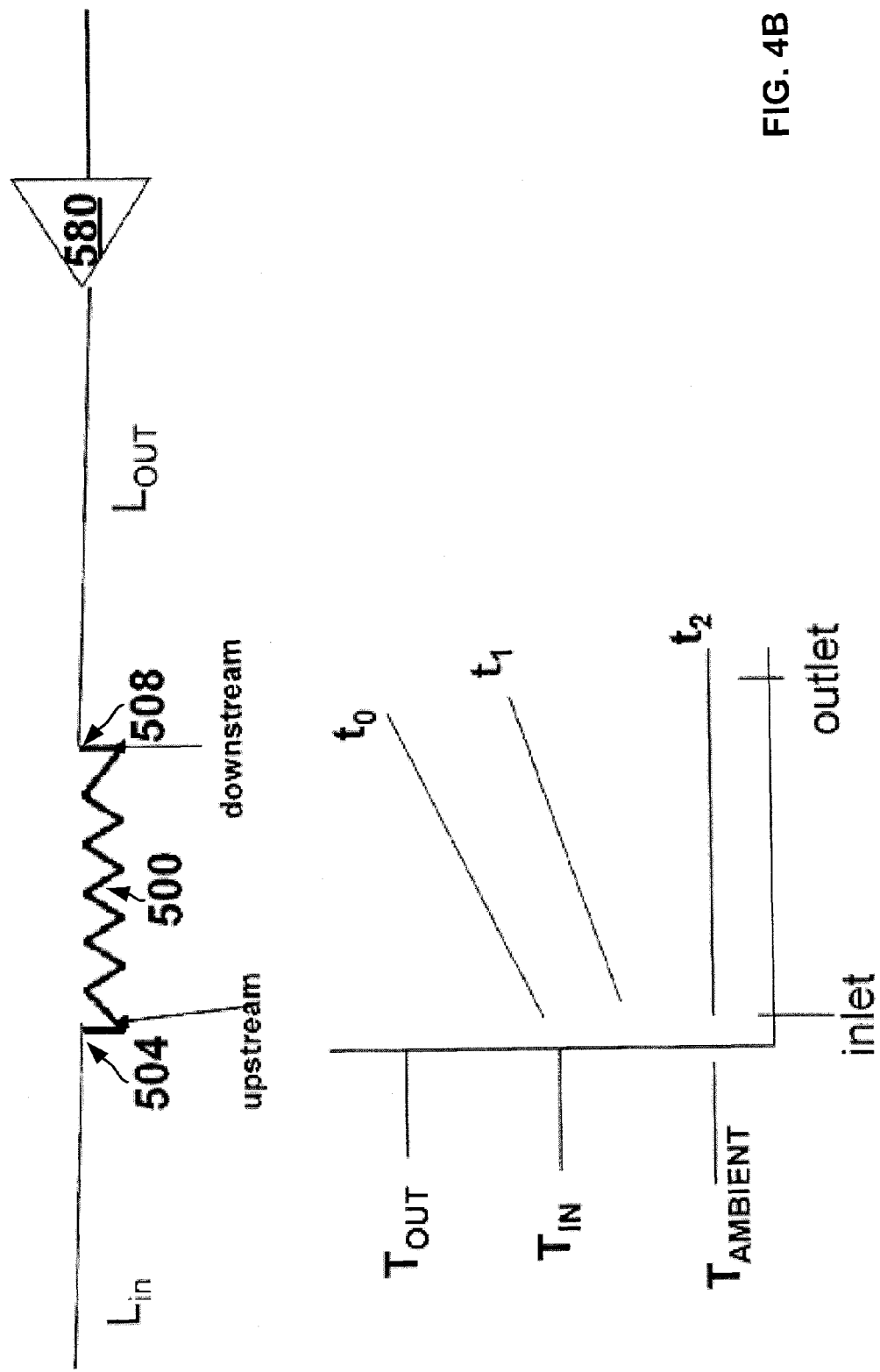

Insolation is variable both predictably (diurnal variation) and unpredictably, due to for example, cloud cover, dust, particulate, solar eclipses, or other reasons. FIGS. 4A-4B illustrate effects on the temperature profile within a solar boiler as a function of time (where $t_1$ is at a later time than $t_0$; $t_2$ is at a later time than $t_1$) during a temporary lapse in insolation. The solar boiler and the steam within the boiler tubes progressively cool. For example, depending on boiler configuration, materials and insulation, as well as ambient weather conditions (as shown in FIG. 4A), the steam in the solar boiler may gradually tend to reach more or less a uniform temperature, which may be at or below the normal-mode inlet temperature, or (as shown in FIG. 4B) as low as the ambient temperature. Cooling scenarios other than those illustrated in FIGS. 4A-4B are possible.

Some embodiments of the present invention relate to methods and apparatus whereby in response to a predicted or detected temporary reduction in available insolation, one or more operations that are potentially useful for preserving a thermal gradient across a solar receiver (for example, a steam superheater or a steam reheater) are carried out. These operation(s) may also be useful for maintaining a temperature within and/or conserving enthalpy within the solar receiver and/or within the turbine itself.

The temporary reduction in available insolation may be attributed to any of a number of causes, including but not limited to, clouds, dust, particulate, weather-related reduced insolation (such as high winds), temporary technical problems of one or more heliostats, or any other reason.

Examples of operations that, in different embodiments, carried out in response to the predicted or detected temporary reduction in available insolation include, but are not limited to, regulating an attemperation flow rate, setting the temperature of steam flowing into or through a solar-steam-powered turbine (or into or through a solar steam superheater or reheater), and reducing the flow of steam into or through a solar-steam-powered turbine (or into or through a solar steam super-heater or reheater). More specifically, the abovementioned operations may be carried out in response to the calculated or determined amount of available insolation. The amount of available insolation may be calculated or determined in response to the detected or predicted transient reduced-insolation event.

In various embodiments, one or more of these presently disclosed operations is carried out at least in part by operating a distributed control system 842 (see FIGS. 6, 7A and 7B) and/or heliostat control system 81 (see FIG. 5) to control attemperation flow rates and/or to control pressures and/or to control heliostat aiming and/or to control any other operating parameter of a solar steam system for generating electricity.

Heliostat controller 81 may be configured to calculate or determine the amount of insolation which is available for every point on the solar receiver. Accordingly, one or more aiming points of one or more heliostats may be modified by heliostat controller 81 in order to compensate for reduced insolation on one or more portions of the solar energy receiving system or on one or more solar receivers. For example, the modified aiming points can be to maintain a uniform temperature or flux profile on a surface of one or more solar receivers. The modifying of the aim of each heliostat can include mechanically moving the heliostat aiming point to cause the projected heliostat beam to move from one face of the solar energy receiving system to another face of the solar energy receiving system (e.g. on the same tower). In an embodiment, the re-aiming of one or more heliostats may cause the respective beam projected therefrom to move only a small distance, for example, by less than 10 m, or less than 5 m, or less than 2 m.

Typically, in previously known systems, attemperation is used to control the temperature of the steam entering the one or more turbines. Attemperation may be used to limit the steam temperatures during steady state operation in order to prevent the temperatures from being above the maximum temperature allowed by the steam turbine and to avoid having to use high cost materials rated for higher temperatures. In some embodiments, attemperation may be located within the superheat and/or the reheater or alternatively on line L2 between the superheater and the steam turbine. In some instances it is advantageous to have multiple attemperation locations, depending on where the cooling effect or temperature control is needed.

Figure 8A:
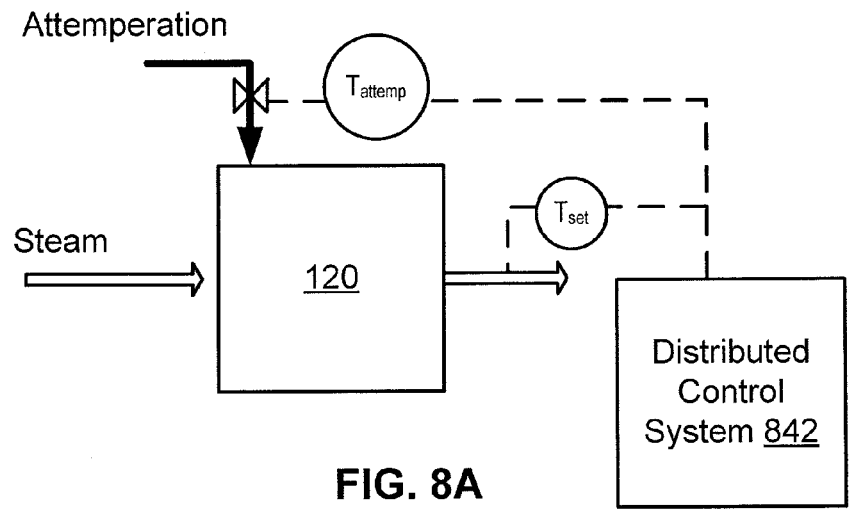
FIGS. 8A-8C are block diagrams of the various control systems relating to a solar steam system, according to one or more embodiments.
Figure 8B:
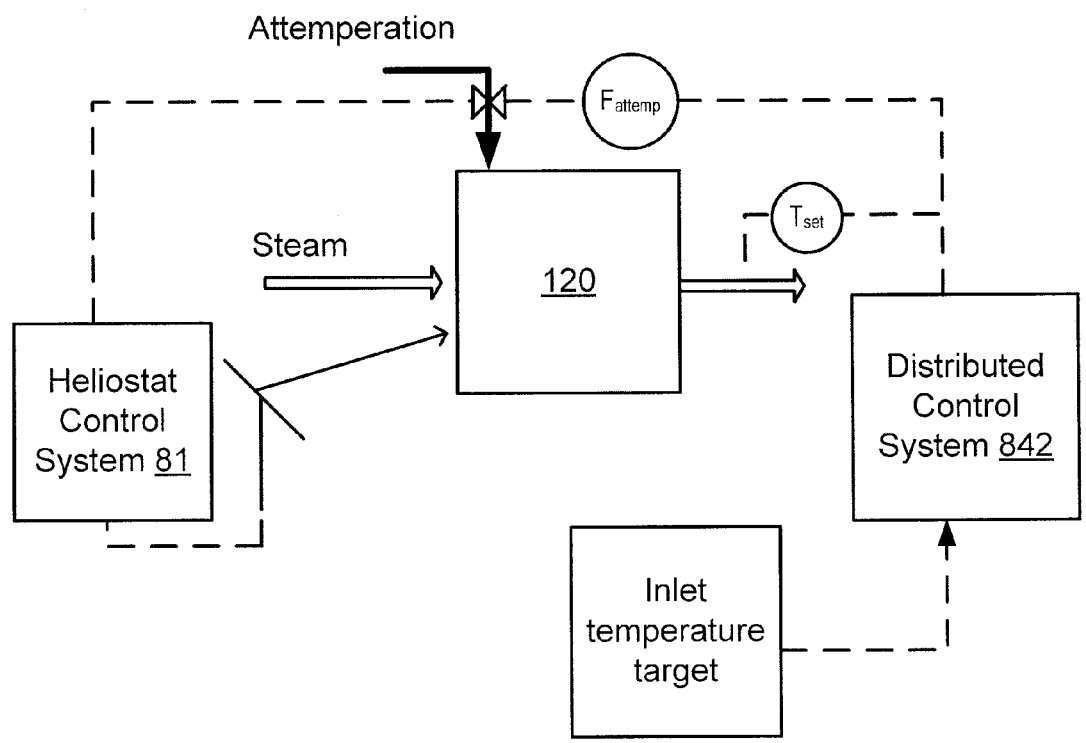
Figure 8C:
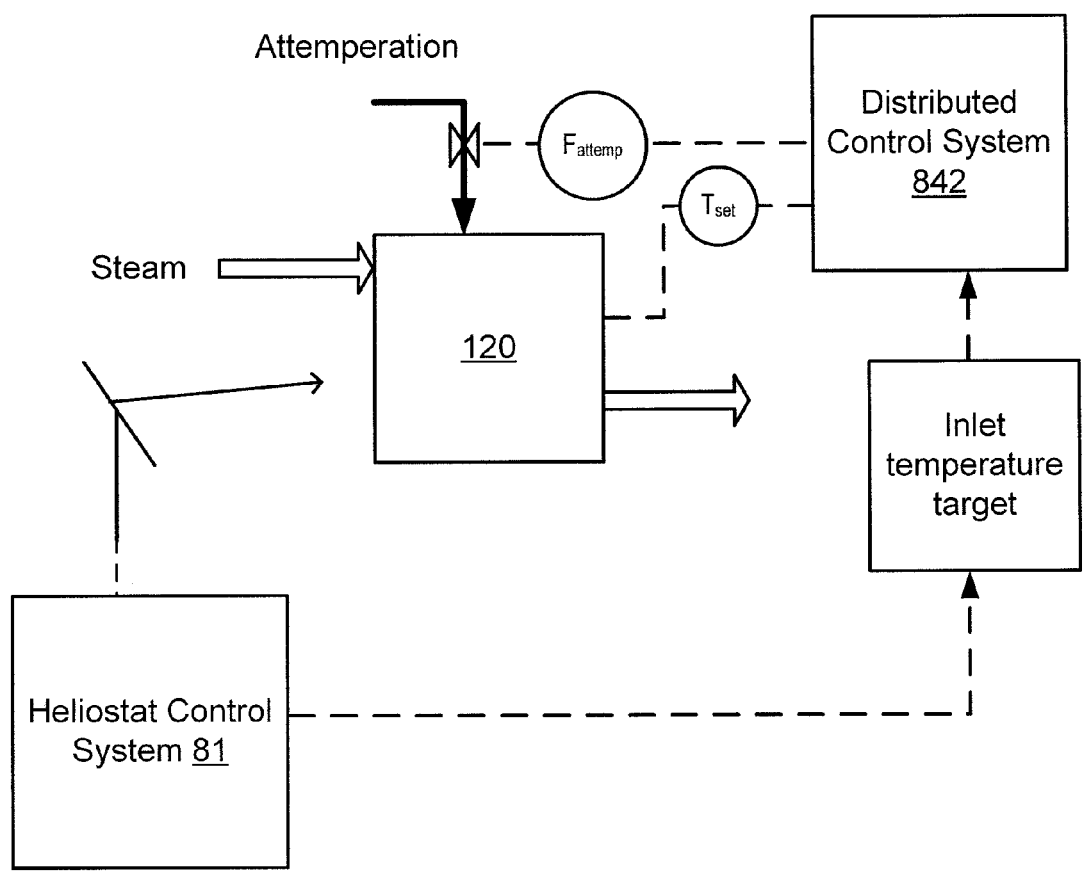

In some embodiments, the attemperator will have a steam temperature setpoint $T_{attemp}$ that is slightly higher than the temperature of the steam setpoint $T_{set}$ as determined by distributed control system 842. $T_{attemp}$ may be between 1 and 5 degrees higher than $T_{set}$. During typical steady state operation, the attemperation is closed (i.e. no spray is flowing into the superheated steam) as long as the steam temperature is maintained in a predefined range. If a signal is sent to distributed control system 842 that the outlet temperature of the steam has exceeded both $T_{set}$ and $T_{attemp}$, distributed control system 842 will open the attemperation valve in order to cool the steam. The attemperation valve will remain open until the temperature of the steam returns to the setpoint temperature (See FIG. 8A).

Figure 5:
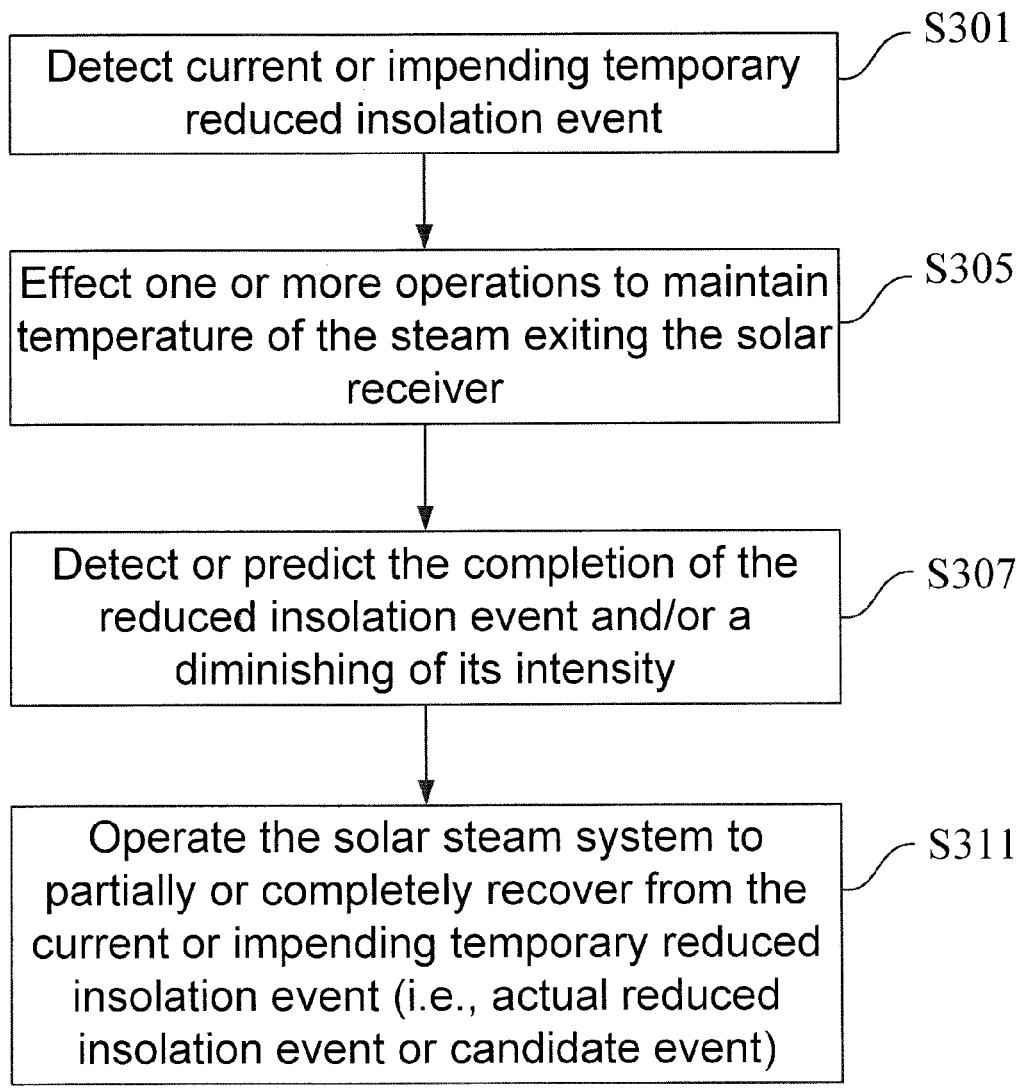
FIG. 5 is a flow chart of a routine for controlling a solar system in response to a predicted or detected temporary/transient reduction in (or elimination of) available insolation, according to one or more embodiments.
Figure 6:
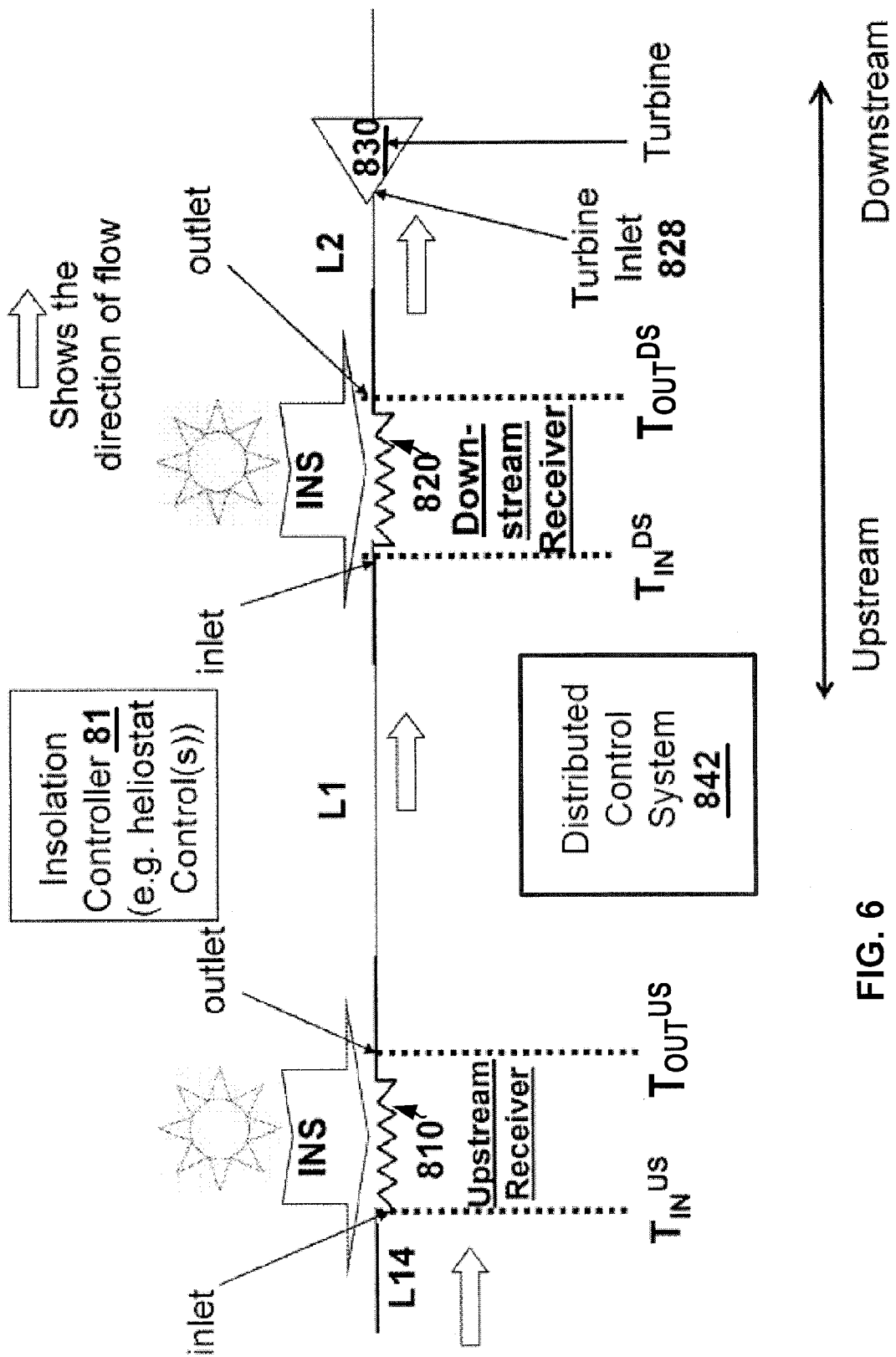
FIGS. 6, 7A and 7B are block diagrams of various systems (or components thereof) where the routine of FIG. 5 (or step(s) thereof) is implemented, according to one or more embodiments.
Figure 7A:
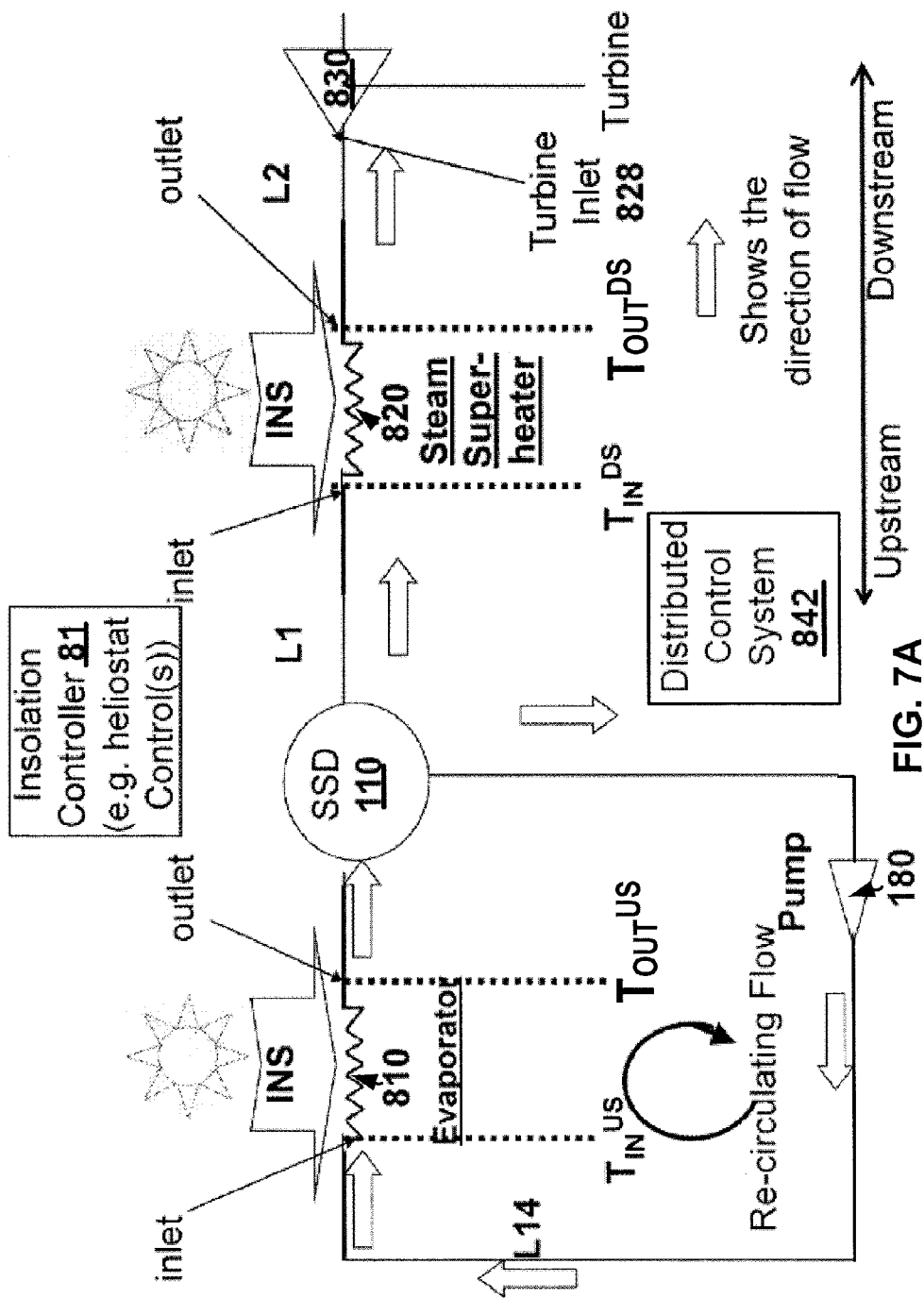
Figure 7B:
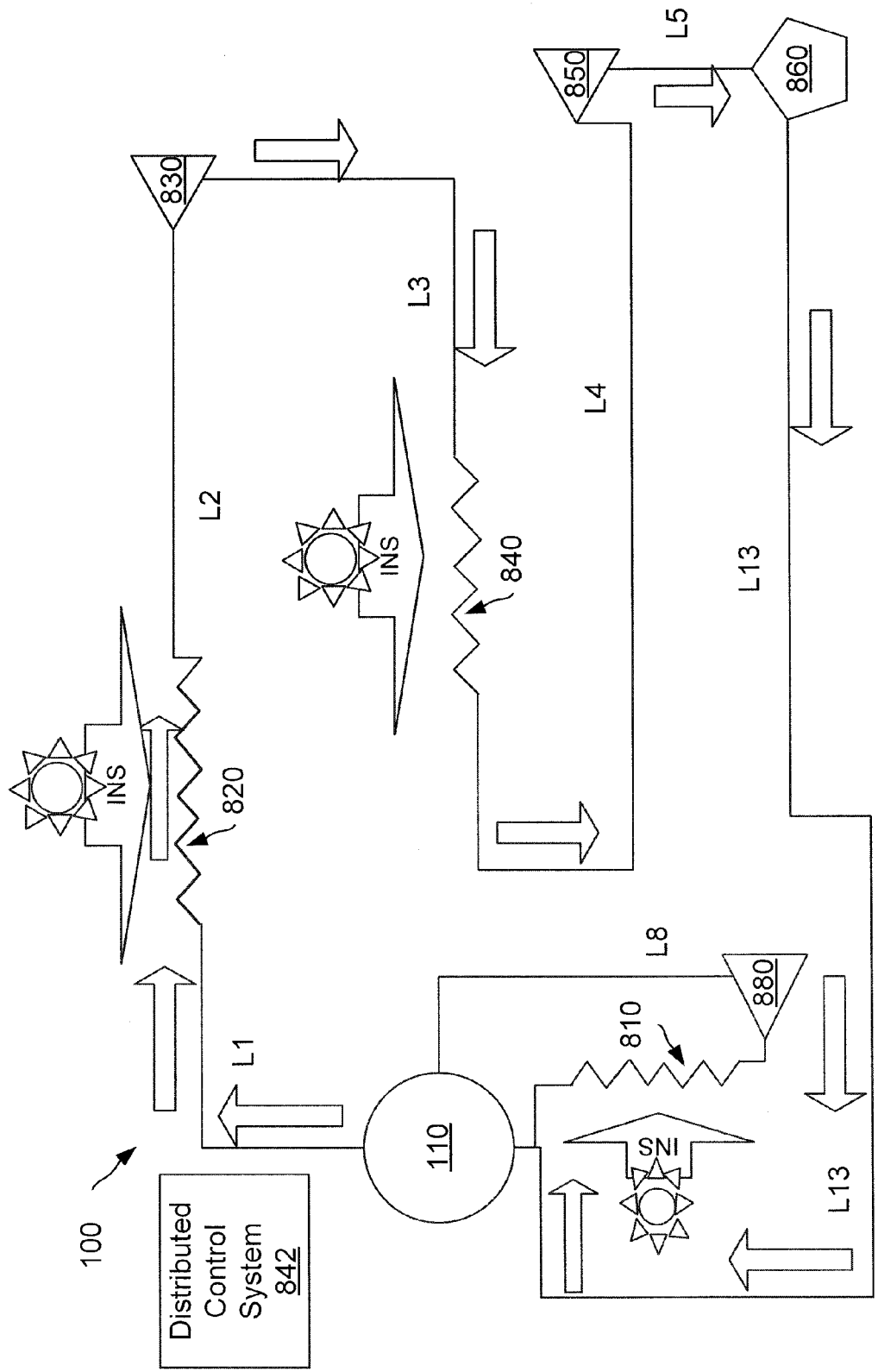

FIG. 5 is a flow chart of a routine for controlling a solar system in response to a predicted or detected temporary/transient reduction in (or elimination of) available insolation and will be explained hereinbelow. FIGS. 6, 7A and 7B are block diagrams of solar steam systems in which the routine of FIG. 4 may be carried out. In some embodiments, the solar steam system includes a distributed control system 842 and/or a heliostat control system 81 that is configured to implement any step or step(s) of the routine of FIG. 5.

As illustrated in FIG. 6, solar steam system includes a first solar receiver 810 (for example, configured as an upstream solar receiver) and a second solar receiver 820 (for example, configured as a downstream solar receiver). Additional solar receivers may be present. Alternatively, fewer solar receivers may be present.

In embodiments, receiver 810 is a solar evaporator configured to boil water into steam, or receiver 810 is a supercritical steam generator configured to generate super-critical steam by heating water or steam to a temperature above a supercritical temperature. The solar evaporator 810 receives liquid and/or vapor $H_2O$ via line L14. The second solar receiver 820 (for example, a solar steam superheater or a solar steam re-heater) further heats steam or supercritical steam received via line L1 generated by the upstream solar receiver 810. The further heated steam exits the downstream receiver via line L2 and is delivered to a turbine 830 having turbine inlet 828. Under normal operating conditions, the steam in line L2 is drier than the steam in line L1.

For the present disclosure, it is understood that the term turbine refers for example, to a large scale turbine, whose power output is on the order of magnitude of a megawatt or more. In different embodiments, the power output of the turbine may be at least 1 megawatt, at least 5 megawatts, at least 10 megawatts, at least 50 megawatts or at least 100 megawatts or at least 200 megawatts or more.

The terms upstream and downstream relate to system configurations that are associated with some embodiments, and are not intended as limiting.

In certain locations in the present disclosure, upstream receiver 810 is referred to as a solar boiler/evaporator or solar evaporator. It is noted that this is not limiting, and in other examples (even when not explicitly mentioned), upstream receiver 810 (or any receiver labeled as 810) may be a solar supercritical steam generator which generates super-critical steam from liquid and/or vapor water.

During normal operating conditions of full insolation, the temperature in the outlet of the steam superheater (or steam reheater 840 of FIG. 7B) can be much hotter than the outlet temperature of the evaporator whose purpose is to convert liquid water (or a mixture of water and vapor) into steam. In different embodiments, the outlet temperature in the steam superheater (or steam reheater 840 of FIG. 7B) is at least 250 or 300 or 350 or 400 or 450 or 500 or 550 or 600 degrees Celsius.

In the example of FIG. 7A, receiver 810 is an evaporator/boiler, receiver 820 is a superheater, and a steam separation vessel for separating between liquid and vapor phases (e.g., steam separation drum 110) is arranged between 810 and 820. In the example of FIG. 7A, solar steam evaporator 810 is configured as a re-circulating boiler (for example, including a pump 180 for re-circulating flow). Thus, liquid or vapor water may make several 'passes' through solar evaporator 810.

In some embodiments, steam separation vessel 110 (e.g., drum) substantially blocks water from reaching the superheater 820. This may prevent damage in the short or long term to the superheater. Blocking may also have the advantage of improving thermal efficiency.

In embodiments, steam separation vessel 110 is specifically a drum, though any dimensions or shape or form factor, for example, effective to separate water vapor and liquid water, may be used.

In addition to the distributed control system 842 discussed above, a solar thermal system may also include a heliostat control system for 81 controlling the mechanical behavior of heliostat(s). For example, see the discussion provided herein with reference to FIG. 2.

FIG. 7B illustrates a solar thermal system which includes a solar reheater. In some embodiments, the systems of FIGS. 6 and/or 7A can be part of the larger system that is described in FIG. 7B. FIG. 7B is a block diagram of a solar boiler system 100 for generating electric from solar energy according to some embodiments. System 100 includes: (i) a steam separation drum 110 from which saturated steam exits; (ii) a solar steam superheater 820 which receives the saturated steam via line L1 and superheats the saturated steam to produce superheated steam; (iii) a high-pressure (HP) turbine 830 which generates work from the superheated steam; (iv) a solar steam reheater 840 which reheats steam that exists the high pressure (HP) turbine 830; (v) a low pressure(LP) turbine 850 which generates work from the reheated steam; and (vi) a condenser 860 (for example, air-cooled or cooled in any other manner) which cools the steam that exits from the low pressure turbine 850.

Referring to FIG. 7B, water and/or steam, indicated by the block arrows, flows as follows: (i) saturated steam flows from the steam separator 110 (in embodiments, a separation drum) to solar steam superheater 820 via line L1; (ii) drier or dry steam flows from solar steam superheater 820 to high pressure turbine 830 via line L2 (iii) high pressure outlet steam exits HP turbine 830 flow to solar steam reheater 840 via line L3; (iv) re-heated steam flows from solar steam reheater 840 to LP turbine 850 via line L4; (v) water and/or steam leaves LP turbine 850 via line L5 and flows to the condenser 860; (vi) the condensed water leaves condenser 860 via line L6 and is pumped by a pump back to a feedwater container (e.g., a feedwater drum) of a solar steam generator (not shown) or alternatively to a treatment plant (not shown).

Both the solar superheater 820 and the solar reheater 840 operate by receiving insolation. In an example, solar superheater and/or solar reheater include a plurality of pipes. In one non-limiting example, steam is heated at least 50 or 75 or 100 or 150 or 200 degrees Celsius by superheater 820. For example, steam may be delivered via line L1 at a temperature of about 300 degrees Celsius to superheater 820, and heated to about 540 degrees Celsius. This 540 degrees Celsius superheated steam is delivered via line L2 to HP turbine 830. In another example, the steam may be heated to supercritical temperatures and pressures. Typically, system 100 operates in a "normal" mode when there is sufficient insolation to provide steam at the temperature and pressure required by one or more of the turbine(s). For example, HP turbine 830 may require steam at a minimum temperature in order to operate at a desired cycle efficiency.

Also illustrated in FIGS. 6, 7A and 7B is a distributed control system 842 for controlling the rate and/or direction of fluid (i.e., liquid or vapor) flow and/or the pressure in one or more vessels or receivers or turbines or connecting lines. Distributed control system 842 may include any combination of (i) mechanical apparatus as the mechanical portion of the control system (for example, including valves, valve controls, motors. actuators) and (ii) electrical circuitry (for example, any combination of analog and/or digital electronics and optionally computer-executable code stored in computer memory or storage) as the electrical portion of the fluid flow control system. The behavior of the mechanical portion of the distributed control system may be regulated by the electrical portion of the distributed control system so that generating an electrical control signal causes the mechanical portion of the control system to respond to regulate flow rate, pressure, flow direction or any other flow property. Thus, it is possible to use electrical signals (e.g., generated by circuitry and/or executing software) to regulate mechanical flow properties.

Distributed control system 842 may be located in any location or combination of locations. Note that the distributed control system 842 has only been represented schematically in the figures as a black box, but can include one or more components, devices, or systems to allow control of the inlet temperature of the steam entering the one or more turbines.

As used herein, the term boiler or solar receiver may be used to refer to any heat transfer and/or receiver combination whether or not boiling actually takes place therein. For example, either the term boiler or the term solar receiver may be applied to a solar steam superheater. The terms solar evaporator or evaporator or boiler/evaporator are used synonymously to refer to a solar receiver configured to heat water from a liquid to a gaseous state. A boiler/evaporator (for example, 810) is one example of a solar receiver. Another example of a solar receiver is a steam superheater (for example, 820). Another example of a solar receiver (not shown in the figures, for example, this may be an upstream 810 or downstream 820 solar receiver) is a supercritical steam generator which generates supercritical steam. Yet another example of a solar receiver is a solar re-heater, which is used to reheat low or intermediate pressure steam extracted from a steam turbine with a reheat cycle. Each solar receiver typically has a set of operating parameters (i.e., temperature and/or pressure and/or flow volumes) permitted by the manufacturer.

As noted above, steam turbine 830 may include a turbine inlet 828 that enables control of the pressure of fluid entering turbine 830 via inlet 828, for example, by controlling the flow resistance such as a valve control or other suitable device. Steam turbines may be controlled at 'start-up' (e.g., in the morning) such that the pressure at the inlet 828 is a linear function of the flow rate. This is referred to as a sliding pressure policy.

With reference to FIG. 5, in step S301, a current or impending reduced insolation event is detected, for example, at a time when solar steam flows from a solar receiver (e.g., downstream solar receiver 820, for example, a solar superheater or reheater) to a steam turbine 830 where useful electricity is produced.

The detection of step S301 can be carried out in any manner by for example environmental condition sensors. In one example, the concentration of dust and/or particulate in the atmosphere may be detected by quantifying scattering of a laser. In another example, the sky and/or the ground are imaged using one or more cameras and analyzing the image for the presence of clouds or shadows or other classifiable and quantifiable features. In another example, the flux intensity is measured by flux meters mounted on or in any solar receiver. The detecting may be carried out automatically or manually. In yet another example, voltage and/or current response in one or more photovoltaic or photochemical devices can be used to determine the presence and insolation-reducing effects of clouds or dust. In another example, a weather station can be used to detect/predict weather events which may reduce insolation levels on the receiver. For example, high winds may necessitate placing at least some of the heliostats into a "safe position" in which the heliostats may no longer direct insolation onto the receiver. In another example, a pyroheliometer may be sued to measure the sun's radiation output.

The environmental condition sensors may detect environmental properties indicating current or expected insolation levels and generate therefrom at least one signal indicating a current or impending reduced insolation event. Characteristics of the current or impending reduced insolation event may then be calculated. The calculated characteristics may then be used to calculate the quantity of available insolation.

The reduced insolation event may be categorized by the type of cloud cover which is detected or predicted. The cloud cover may be categorized as light cloud cover, through which a relatively large amount insolation passes through the clouds. Alternatively, the cloud cover may be categorized as heavy cloud cover, through which a relatively small amount of insolation passes.

In step S305, one or more operations are effected to counteract the degradation of the thermal gradient across solar receiver 820, which may be a steam superheater or a steam re-heater (for example, see element 840 of FIG. 7B). This thermal gradient degradation (i.e., where the difference between $T_{OUT}$ and $T_{IN}$ of receiver 820 decreases) results from the reduced insolation event, since less solar radiation is available to heat fluid within receiver 820.

For example, step S305 may be carried out by generating an electrical control signal and/or sending an electrical control signal to distributed control system 842 and/or heliostat control system 81 (see FIG. 2).

A current or impending transient reduced insolation event may be detected or predicted. In one example (FIG. 7B), the reduced insolation event data may be processed by heliostat control system 81. Heliostat controller system 81 may be configured to determine the amount of available insolation which will be available during the reduced insolation event. Once the amount of available insolation is determined, heliostat controller 81 allocates heliostats to direct insolation to the receiver (over firing) such that the outlet temperature of the steam is greater than $T_{set}$ and $T_{attemp}$ thereby forcing the attemperation valve to open. By having the attemperation flow valve open prior to and during the reduced insolation event, the outlet temperature of the steam may be adjusted via the attemperation flowrate ($F_{attemp}$) and maintained with a quick response. As the reduced insolation event causes a reduction in available insolation the attemperation flow is reduced in order to maintain the outlet temperature of the steam. As the reduced insolation event comes to an end, causing a sudden increase in insolation, $F_{attemp}$ increases again, thereby maintaining the outlet temperature of the steam exiting from the receiver. As the above attemperation control method reduces large fluctuations in temperature, it may useful to utilize this methodology in conjunction with a steam turbine which may not be able to operate with large fluctuations in temperature.

In cases where the reduced insolation event is detected or predicted to be heavy clouds, step S305 may also include setting the inlet temperature of the steam entering the turbine based at least in part on the amount of available insolation as determined or calculated by heliostat controller 81. When heliostat controller 81 determines that it will not be able to provide sufficient insolation to maintain the inlet temperature of the steam, it sends a signal to distributed control system 842. Heliostat controller 81 thereby provides a new steam inlet temperature setpoint. In some embodiments, the inlet temperature of the steam as set by heliostat controller 81 in response to a predicted or detected reduced insolation event is less than the inlet temperature of the steam as set by distributed control system 842 before the reduced insolation event. For example, the steam inlet temperature setpoint as set by heliostat controller 81 is 50° C., 75° C., 100° C. or 150° C. less than the steam inlet setpoint as set by distributed control system 842, i.e. the maximum inlet temperature allowed in the steam turbine. The term inlet steam temperature refers to the temperature of the steam as it enters the one or more turbines.

According to some embodiments, step S305 may include both the operations of heliostat controller 81 (i) controlling the attemperation flow valve so that it remains open prior to or during the detected or predicted reduced insolation event in order to maintain a constant inlet temperature of the steam as well as (ii) setting the inlet temperature of the steam in accordance to what the heliostat controller determines or calculates is available in terms of available insolation. In alternative embodiments, heliostat controller 81 controls (i) the attemperation flow valve so that it remains open prior to or during the detected or predicted reduced insolation event in order to maintain a constant inlet temperature of the steam or (ii) setting the inlet temperature of the steam in accordance to what the heliostat controller determines or calculates is available in terms of available insolation.

Step S305 may also relate to reducing the rate of flow of fluid from the first solar evaporator 810 to the second solar receiver 820 and/or reducing the flow rate of superheated steam from solar receiver 820 into turbine 830. In embodiments, this flow reduction may reduce the amount of electricity generated during the reduced insolation time period (i.e., either a time period where insolation is actually reduced or when one or more indicators predictive of a current or impending insolation reduction have been detected). Alternatively, turbine inlet 828 may be 'throttled' to reduce the flow of steam into turbine 830. For example, the turbine can be operated so that the pressure of inlet steam remains substantially constant even as the flow rate of steam into turbine (i.e., 830 or 850) is reduced significantly (e.g., a decreasing load range that is at least 10% or at least 15% or at least 20% or at least 30% or at least 50% or at least 70% of the maximum load capacity). As used herein, % load or load capacity may refer synonymously to the rate of steam flow into turbine 830 (or 850) and/or the amount of electricity generated by turbine (as a percentage of the maximum).

In some embodiments, step S305 may also relate to increasing or decreasing the required steam drum feedwater in response to a detected or predicted current or impending transient reduced insolation event. Alternatively or additionally, step S305 may relate to setting a higher or lower water level in the steam drum in response to a detected or predicted current or impending transient reduced insolation event.

Alternatively or additionally, it is possible in steps S305 or S311 of FIG. 5 to modify the heliostat aiming policy (e.g., using controller(s) 81) to influence the solar-radiation thermodynamic process. In step S305, it is possible to re-direct heliostats that were previously aimed at the solar evaporator (or supercritical steam generator) 810 to the steam superheater 820 (or steam re-heater). In step S311, it is possible to re-direct heliostats that were previously aimed at the solar evaporator (or supercritical steam generator) 810 to the steam superheater 820 (or steam re-heater).

In step S307, a detection or prediction related to the conclusion (or reduction in its intensity) of the reduced insolation event is made and/or an updated prediction (or detection) is carried out that nullifies a previous prediction of reduced insolation (e.g., a prediction that in retrospect was false). In different non-limiting examples, the intensity of a reduced insolation event may relate to the intensity or thickness of cloud coverage and/or the intensity (or concentration) of dust/particulate and/or the extent of a solar eclipse.

In a first example relating to step S307, an actual increase in the insolation level may be predicted or detected after an actual reduced-insolation event occurs.

In a second example, there may be no requirement for an actual reduction in insolation in step S301 and no requirement for an actual (or predicted) increase in insolation in step S307. According to this second example, in step S301 a prediction is made (or some indication of current or future reduced insolation is detected) related to a reduction in insolation, for example, cloud coverage may be detected 5 kilometers south of a solar thermal power facility. In step S307, further information (e.g., later information) indicates that the predicted scenario (e.g., because of nearby cloud coverage) did not or will not occur.

The detecting/predicting of step S307 may be carried out in any manner, for example, see step S301. In an example, it is possible to utilize historical data (for example, describing how long cloud coverage persists in a certain location). In another example meteorological data and/or maps based on satellite imaging or radar scanning can be analyzed, alone or in conjunction with weather forecasting models. Alternatively or additionally, it is possible to detect one or more physical parameters (e.g., cloud coverage, flux or any other physical parameter) at multiple points in time and to use time series techniques or neural networks or any other prediction algorithm.

In step S311, the solar steam system is operated to partially or completely recover from the actual or predicted reduced insolation event (i.e., whether or not the actual event occurred, there may be a need to recover from the operation(s) of step S305). For example, the temperature setpoint of the steam exiting the receiver may be determined by the distributed control system and the attemperator flow valve may be set so that it is only opened once the outlet temperature of the steam is greater than $T_{attemp}$. In another example, heliostats may be redirected from the solar receiver 820 back towards an evaporator (or supercritical steam generator) 810.

As noted above, the routine of FIG. 5 does not require an actual reduction in insolation and/or does not require a reduction in insolation that is sustained for any period of time.

Thus, in a first example, there may be no actual reduction in insolation. Instead, in step S301, a prediction of an impending reduction in insolation is made, the system reacts accordingly in step S305. For example, it is possible to open attemperator flow valve by an amount such that the valve is at least 15% or at least 20% or at least 25% or at least 30% open in only a few minutes. In step S311, it turns out the prediction is only a 'false alarm,' and it is possible to close the attemperator flow valve relatively quickly.

In a second example, the amount of reduction in insolation is only minimal, for example, less than 30% or less than 20% or less than 10% or less than 5%. By operating to carry out the routine of FIG. 5, it is possible to decrease the likelihood that such a reduction in insolation would cause turbine shutdown and its associated extended start-up process.

In some embodiments, one or more of the teachings described herein is useful for at least one of: increasing solar energy generation efficiency during days of intermittent cloudy periods, maximizing electricity production and/or revenue generation of a solar electric facility, and meeting reliability requirements of an electric transmission network operator.

It will be appreciated that the modules, processes, systems, and sections described above can be implemented in hardware, hardware programmed by software, software instruction stored on a non-transitory computer readable medium or a combination of the above. A system for controlling the heliostats, the receiver, and/or the distributed control system can be implemented, for example, using a processor configured to execute a sequence of programmed instructions stored on a non-transitory computer readable medium. The processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

Furthermore, the modules, processes, systems, and sections can be implemented as a single processor or as a distributed processor. Further, it should be appreciated that the steps discussed herein can be performed on a single or distributed processor (single and/or multi-core). Also, the processes, modules, and sub-modules described in the various figures of and for embodiments above can be distributed across multiple computers or systems or can be co-located in a single processor or system. Exemplary structural embodiment alternatives suitable for implementing the modules, sections, systems, means, or processes described herein are provided below, but not limited thereto. The modules, processors or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example. Moreover, embodiments of the disclosed method, system, and computer program product can be implemented in software executed on a programmed general purpose computer, a special purpose computer, a microprocessor, or the like.

Embodiments of the method and system (or their subcomponents or modules), can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, etc. In general, any process capable of implementing the functions or steps described herein can be used to implement embodiments of the method, system, or a computer program product (software program stored on a non-transitory computer readable medium).

Furthermore, embodiments of the disclosed method, system, and computer program product can be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of solar thermal energy production, heliostat control systems, and/or computer programming arts.

The description, embodiments and figures should not to be taken as limiting the scope of the appended claims. Rather, it should be understood that not every disclosed feature is necessary in every implementation of the invention. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to"), rather than the mandatory sense (i.e., meaning "must").

Certain features of the disclosed subject matter, which are, for clarity, described in the context of separate embodiments, may also be provided in combination in a single embodiment. Conversely, various features of the invention, which are, for brevity, described in the context of a single embodiment, may also be provided separately or in any suitable sub-combination.

It is thus apparent that there is provided, in accordance with the present disclosure, methods and systems for operating a solar steam system. Many alternatives, modifications, and variations are enabled by the present disclosure. While specific embodiments have been shown and described in detail to illustrate the application of the principles of the invention, it will be understood that the invention may be embodied otherwise without departing from such principles. Features of the disclosed embodiments may be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A method of controlling a solar steam system, the solar steam system having one or more steam turbines and one or more solar receivers, the method comprising:
   (i) by one or more environmental condition sensors, detecting environmental properties indicating current or expected insolation levels, and generating, based on the detected environmental properties, at least one signal indicating a current or impending transient reduced-insolation event;
   (ii) receiving the at least one signal from the one or more environmental condition sensors;

(iii) calculating, responsively to the received at least one signal, characteristics of the current or impending transient reduced-insolation event;

(iv) in response to the calculated characteristics, calculating a quantity of available insolation; and (v) controlling an attemperation flow rate in the solar steam system responsively to the calculated quantity of available insolation such that the temperature of steam entering the one or more steam turbines is maintained in a predefined range.

2. The method of claim 1, wherein the environmental condition sensors include at least one of a pyroheliometer, a camera aimed at the sky, a camera positioned and aimed to capture cloud shadows, a device to measure dust and/or particulate levels, a flux measurement device and a weather station.

3. The method of claim 1, wherein the one or more solar receivers is selected from the group consisting of a solar steam superheater and a solar steam reheater.

4. The method of claim 1, wherein the current or impending transient reduced-insolation event is one of a cloud-induced reduced insolation event, a weather-induced reduced insolation event and a dust/particulate-induced reduced insolation event.

5. The method of claim 1, wherein the controlling the attemperation flow rate comprises re-aiming a plurality of heliostats to increase a total amount of insolation directed at the one or more solar receivers while opening an attemperation valve so as to increase the attemperation flow rate.

6. The method of claim 1, further comprising:
(vi) setting the inlet temperature of the steam entering the one or more steam turbines to a first inlet temperature based at least in part on the calculated quantity of available insolation.

7. The method of claim 6, further comprising:
(vii) in response to an additional insolation level detection or prediction that occurs at a later time after the controlling the attemperation flow rate, regulating an inlet temperature of the steam entering the one or more steam turbines to be a second inlet temperature,
wherein the first inlet temperature of the steam in step (vi) is less than the second inlet temperature of the steam in step (vii).

8. The method of claim 7, wherein the first inlet temperature of the steam in step (vi) is at least 50° C. less than the second inlet temperature of the steam in step (vii).

9. The method of claim 1, further comprising reducing the flow rate of steam to the one or more steam turbines.

10. A solar steam system for generating electricity from solar radiation, comprising:
one or more solar receivers, each being configured to heat steam therein with insolation such that outlet steam temperature at the outlet of each solar receiver exceeds a temperature at an inlet thereto;
one or more steam turbines configured to receive the insolation-heated steam from the one or more solar receivers; and
an attemperation flow control unit comprising a mechanical flow control device that regulates a flow property of an attemperation flow and electrical circuitry configured to control the mechanical flow control device to regulate the attemperation flow so as to maintain the temperature of steam entering the one or more steam turbines within a predetermined range about a first reduced temperature during a transient reduced-insolation event in response to a control signal indicating a reduction in insolation;
wherein the control signal is generated from one or more environmental condition sensors that indicate changes in insolation due to the transient reduced-insolation event,
and the attemperation flow control unit is configured to initially increase the attemperation flow responsively to said control signal indicating the reduction in insolation so as to reduce the temperature of the steam to the first reduced temperature.

11. The solar steam system of claim 10, wherein the one or more solar receivers is selected from the group consisting of a solar steam superheater and a solar steam reheater.

12. The solar steam system of claim 10, further comprising a distributed control system configured to maintain the temperature of steam entering the one or more steam turbines within a predetermined range about a second temperature before and/or after the transient reduced-insolation event, the second temperature being greater than the first reduced temperature.

13. The solar steam system of claim 10, further comprising:
additional electronic circuitry configured to analyze data descriptive of prevailing or historical weather conditions and to detect current changes in insolation or predict changes in insolation according to results of the analysis,
wherein the additional electronic circuitry includes one or more of analog electronics, and digital electronics.

14. A method of controlling a solar steam system, the solar steam system having one or more steam turbines and one or more solar receivers, the method comprising:
at a first time:
controlling the solar steam system such that steam entering the one or more steam turbines has a first set temperature; and
at a second time:
(i) by one or more environmental condition sensors, detecting environmental properties indicating current or expected insolation levels, and generating, based on the detected environmental properties, at least one signal indicating a current or impending transient reduced-insolation event;
(ii) receiving the at least one signal from the one or more environmental condition sensors;
(iii) calculating, responsively to the received at least one signal, characteristics of the current or impending transient reduced-insolation event;
(iv) in response to the calculated characteristics, calculating a quantity of available insolation; and
(v) responsively to the calculated quantity of available insolation,
controlling the solar steam system such that the steam entering the one or more steam turbines has a second set temperature;
wherein the second set temperature of the steam at the second time is lower than the first set temperature of the steam at the first time.

15. The method of claim 14, wherein the second set temperature of the steam at the second time is at least 50° C. less than the first set temperature of the steam at the first time.

16. The solar steam system of claim 10, further comprising the one or more environmental condition sensors, the one or more environmental condition sensors comprising at least one of a pyroheliometer, a camera aimed at the sky, a camera positioned and aimed to capture cloud shadows, a device that measures dust and/or particulate levels, a flux measurement device, and a weather station.

17. The method of claim 1, wherein the controlling an attemperation flow rate comprises:
(a) prior to or during an initial period of the reduced-insolation event, directing insolation to the one or more solar receivers so as to increase a temperature of the steam exiting the one or more solar receivers above a first temperature and then increasing an attemperation flow rate to reduce a temperature of the steam entering the one or more steam turbines to a first temperature;

(b) during one or more periods of the reduced-insolation event, reducing the attemperation flow rate as available insolation decreases so as to maintain the temperature of the steam entering the one or more steam turbines at said first temperature; and (c) at an end of the reduced-insolation event, increasing the attemperation flow rate so as to maintain the temperature of the steam entering the one or more steam turbines at said first temperature.

18. The method of claim 17, further comprising, after (c), controlling the attemperation flow rate such that the temperature of the steam entering the one or more steam turbines increases to a second temperature greater than the first temperature.

* * * * *